US012675495B2

(12) United States Patent
Merchant et al.

(10) Patent No.: US 12,675,495 B2
(45) Date of Patent: *Jul. 7, 2026

(54) NATURAL LANGUAGE TO CUSTOMIZE DATA VISUALIZATION

(71) Applicant: Palo Alto Networks, Inc., Santa Clara, CA (US)

(72) Inventors: Sameer D. Merchant, Sunnyvale, CA (US); Zana Vosough, San Francisco, CA (US); Rajesh Bhagwat, Los Gatos, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/970,616

(22) Filed: Dec. 5, 2024

(65) Prior Publication Data

US 2025/0094434 A1 Mar. 20, 2025

Related U.S. Application Data

(63) Continuation of application No. 18/216,505, filed on Jun. 29, 2023, now Pat. No. 12,197,452.

(51) Int. Cl.
G06F 16/248 (2019.01)
G06F 16/242 (2019.01)

(52) U.S. Cl.
CPC .......... *G06F 16/248* (2019.01); *G06F 16/243* (2019.01)

(58) Field of Classification Search
CPC ............................. G06F 16/248; G06F 16/243
See application file for complete search history.

(56) References Cited

U.S. PATENT DOCUMENTS

| | | | |
|---|---|---|---|
| 11,062,371 B1 | 7/2021 | Yin | |
| 11,444,847 B1 | 9/2022 | Wernick | |
| 2016/0034705 A1 | 2/2016 | Horvitz | |
| 2016/0335372 A1 | 11/2016 | Latzina | |
| 2017/0004183 A1 | 1/2017 | Srivastava | |
| 2018/0144385 A1 | 5/2018 | Subramanya | |
| 2019/0370669 A1 | 12/2019 | Pais | |
| 2020/0013411 A1 | 1/2020 | Kumar | |
| 2020/0117658 A1 | 4/2020 | Venkata | |
| 2020/0301916 A1 | 9/2020 | Nguyen | |
| 2021/0149886 A1 | 5/2021 | Zheng | |
| 2021/0192412 A1 | 6/2021 | Krishnaswamy | |
| 2022/0277019 A1* | 9/2022 | Mitelman | ......... G06F 16/24535 |
| 2022/0366153 A1 | 11/2022 | Li | |
| 2022/0405314 A1 | 12/2022 | Du | |
| 2023/0060252 A1 | 3/2023 | Bly | |
| 2023/0153310 A1 | 5/2023 | Yun | |
| 2023/0215577 A1* | 7/2023 | Molero Leon | ......... G16H 10/20 |
| | | | 705/2 |
| 2023/0315856 A1 | 10/2023 | Lee | |

* cited by examiner

*Primary Examiner* — Tarek Chbouki
(74) *Attorney, Agent, or Firm* — Van Pelt, Yi & James LLP

(57) ABSTRACT

A system, method, and device for generating data visualizations are disclosed. The method includes (i) obtaining a natural language query, (ii) determining an intent for the natural language query, (iii) generating one or more data requests to one or more selected data sources, the one or more data requests being based at least in part on the intent, (iv) abstracting result data to obtain a data abstraction, the result data being responsive to the one or more data requests, and (v) generating a visualization for the result data based at least in part on the data abstraction.

26 Claims, 25 Drawing Sheets

1500

200

205

500

540

```
SELECT    time, incidents
FROM    incident_list
WHERE    country = 'USA';
```

530

CHATBOT

520

△

I would like to see the number of incidents over last week in the USA.

510

600

| Country | Time | # of Incidents | Device Type |
|---------|------|----------------|-------------|
| USA | 10.09 | 2150 | IT |
| USA | 9.09 | 2089 | Network |
| USA | 8.09 | 2075 | Network |
| USA | 7.09 | 2242 | Office |
| USA | 6.09 | 2345 | IT |
| USA | 5.09 | 2114 | Office |
| USA | 4.09 | 2102 | Office |
| China | 10.09 | 2150 | Network |
| China | 9.09 | 2089 | Facility |
| China | 8.09 | 2075 | Facility |
| China | 7.09 | 2242 | IT |
| China | 6.09 | 2345 | Office |
| China | 5.09 | 2114 | Office |
| China | 4.09 | 2102 | IT |

| Column | Snapshot | Missing | Mean | Median | SD |
|---|---|---|---|---|---|
| Country | 2 categories | 0.0% | - | - | - |
| Time | 4 ... 10 | 0.0% | 7.1 | 7.1 | 2.1 |
| #Incidents | 2,075 ... 2,345 | 0.0% | 2,160 | 2,114 | 95 |
| Device type | 4 categories | 0.0% | - | - | - |

700 ⟶

| Time | # of Incidents |
|------|----------------|
| 10.09 | 2150 |
| 9.09 | 2089 |
| 8.09 | 2075 |
| 7.09 | 2242 |
| 6.09 | 2345 |
| 5.09 | 2114 |
| 4.09 | 2102 |

| Column | Snapshot | Missing | Mean | Median | SD |
|--------|----------|---------|------|--------|-----|
| Time | | 0.0% | 7.1 | 7.1 | 2.2 |
| #Incidents | | 0.0% | 2,160 | 2,114 | 99 |

750 ⟶

Incidents Data

900

910

PLOT app_risk
VERSUS
app, edge_disp
AS bar
VARIANT stacked

920

PLOT threat_type
VERSUS
threat_cat
AS parallelsets
VARIANT None

930

PLOT count
VERSUS date,
size
AS bubble
VARIANT None

940

PLOT app_risk
VERSUS app
AS donut
VARIANT None

950

PLOT app_risk
VERSUS
app, edge_disp
AS bar
VARIANT grouped

960

PLOT count
VERSUS
date, edge_disp
AS bar
VARIANT grouped

1200

1205 1. Create all possible ordered subsets

1210 2. Check each rule against each subset

1215 3. Create a score vector for each rule

1220 4. Rank the rules
PARETO FRONT optimization algorithm + within one front we sort by product

1225 5. Produce data viz solutions

1230 6. Recommendation & lifelong learning
Life-long learning
Change user preference score in the score vector

1400

1500

1600

Start

Obtain query data responsive to the query ⟋1805

Perform abstraction of the query data to obtain a data abstraction ⟋1810

Provide the data abstraction ⟋1815

No— Done? ⟋1820

Yes

End

<u>1800</u>

1900

2000

2200

2400

NATURAL LANGUAGE TO CUSTOMIZE DATA VISUALIZATION

CROSS REFERENCE TO OTHER APPLICATIONS

This application is a continuation of U.S. patent application Ser. No. 18/216,505, entitled NATURAL LANGUAGE TO CUSTOMIZE DATA VISUALIZATION filed Jun. 29, 2023 which is incorporated herein by reference for all purposes.

BACKGROUND OF THE INVENTION

In today's information-driven society, organizations and individuals rely on data analysis to uncover meaningful patterns, identify trends, and extract actionable insights. Traditional methods of data analysis often involve complex spreadsheets, lengthy reports, and static charts, which can be time-consuming and challenging to interpret, especially for non-technical users. There is a growing need for more efficient and user-friendly techniques to visualize data in a manner that is both comprehensible and visually engaging.

Existing data visualization tools often require manual configuration and lack the ability to dynamically adapt to different datasets and user queries. Moreover, the process of generating visualizations typically demands a deep understanding of data structures and programming skills, limiting accessibility to a specialized group of users. Consequently, there is a demand for an automated system that seamlessly generates insightful and interactive visualizations from diverse data sources, catering to the needs of users with varying levels of technical expertise.

BRIEF DESCRIPTION OF THE DRAWINGS

Various embodiments of the invention are disclosed in the following detailed description and the accompanying drawings.

DETAILED DESCRIPTION

Figure 1:
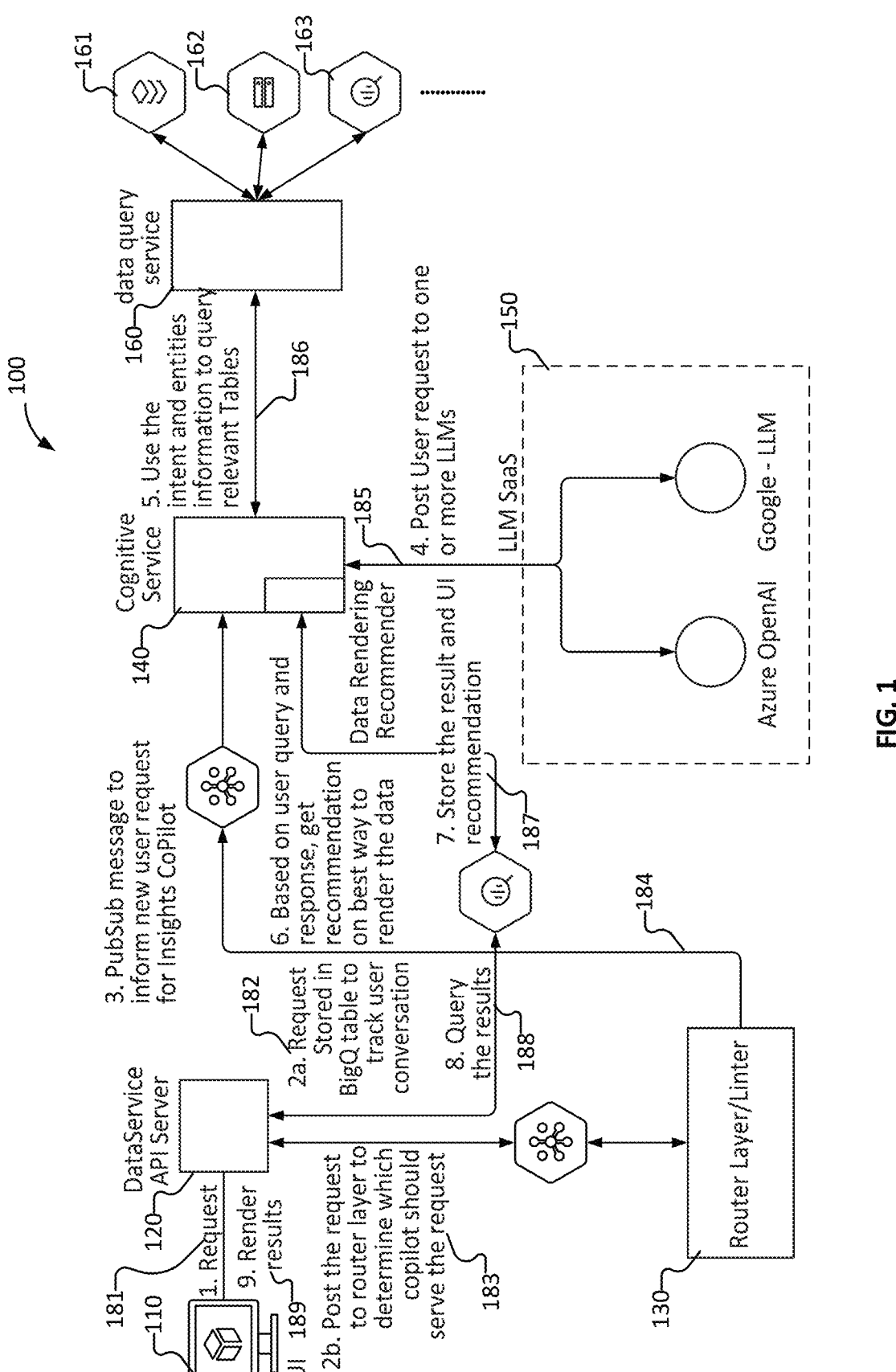
FIG. 1 is a block diagram of a system for generating data visualizations according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Related art systems and methods for generating data visualizations in response to queries generally include predefined visualizations or dashboards that require a significant degree of customization by developers. A prominent way to provide visibility and insights to data is through custom dashboards that provide a visual representation of data collected from various sources. Related art custom dashboards generally provide a limited set of prebuilt widgets provided by a specific application or built using applications/services (e.g., Grafana). In most cases, such custom dashboards require an explicit engineering effort and are inflexible. The predefined widgets provide limited visualization to the user. Further, if a user requires a new filter or a different data representation, such a requirement generally necessitates an engineering effort.

Related art systems and processes for generating data visualizations generally require a user to input a query with a high degree of specificity or in accordance with a particular syntax. In contrast, various embodiments enable the user to input the query as a natural language query, and the system automatically infers an intent for the query, determines a visualization type to be used to represent result data, and generates a corresponding visualization.

Various embodiments solve the problem of inflexibility and need for engineering resources, which are inherent in related art solutions. According to various embodiments, the system or process for generating visualizations enables a user to build a "no-code" natural language-driven customized data visualization/data visualization dashboard. The user inputs a natural language query and in response to receiving the natural language, the system uses the machine learning model to infer the intent of the query (e.g., the parameters for the query, the task, the design, etc.), and automatically generates a visualization based on the intent of the query. In connection with automatically generating a visualization, the system represents or describes the data visualization in a computable manner. For example, the system/process for generating the data visualization represents a query in a high-level language (e.g., the query is abstracted to a high level and represented in a predefined data visualization language). The high-level language (e.g., predefined data visualization language) may serve as an intermediate language to represent the query or definition for the visualization for use across a plurality of libraries, applications, or services for generating visualizations. The visualization definitions in the predefined data visualization language can be translated into other high-level languages that are used by specific libraries, applications, or services, or otherwise used to generate certain visualization types.

Various embodiments disclosed herein provide a system, method, and device for generating data visualizations. The method includes (i) obtaining a natural language query, (ii) determining an intent for the natural language query, (iii) generating one or more data requests to one or more selected data sources, the one or more data requests being based at least in part on the intent, (iv) abstracting result data to obtain a data abstraction, the result data being responsive to the one or more data requests, and (v) generating a visualization for the result data based at least in part on the data abstraction.

Various embodiments disclosed herein provide a system, method, and device for generating data visualizations. The method includes (i) obtaining a natural language query, (ii) determining an intent for the natural language query, (iii) generating one or more data requests to one or more selected data sources, the one or more data requests being based at least in part on the intent, (iv) obtaining a predicted visualization definition based at least in part on abstracting the result data, and (v) generating a visualization for the result data based at least in part on the predicted visualization definition.

FIG. 1 is a block diagram of a system for generating data visualizations according to various embodiments. In some embodiments, system 100 implements at least part of process 1000 of FIG. 10, process 1100 of FIG. 11, process 1200 of FIG. 12, process 1300 of FIG. 13, process 1400 of FIG. 14, process 1500 of FIG. 15, process 1600 of FIG. 16, process 1700 of FIG. 17, process 1800 of FIG. 18, process 1900 of FIG. 19, process 2000 of FIG. 20, process 2100 of FIG. 21, process 2200 of FIG. 22, process 2300 of FIG. 23, and/or process 2400 of FIG. 24.

In the example shown, system 100 enables a user to input a natural language query and the service (e.g., a cloud service) to generate a data visualization based on the natural language query. The service interprets the natural language query, determines an intent of the query (e.g., data to be used, tasks to be performed, design configurations), and generates the data visualization.

As illustrated, system 100 comprises a client system 110, DataService API server 120, router layer 130, cognitive service 140, LLM service 150, and data query service 160.

Client system 110 is configured to present a user interface to the user. The user interface is configured to enable the user to input a natural language query, such as in the form of a chat with a chatbot. At 181, the user inputs a request to the user interface and the request is communicated to DataService API server 120. In response to DataService API server 120 receiving the request comprising a natural language query, at 182, DataService API server 120 stores the request association with the user so system 100 can track the conversation/interaction with the user. The request may be stored in a table with user interactions/communications. At 183, DataService API server 120 posts the request to router layer 130, which is configured to determine the service or system to process the request. At 184, router layer 130 communicates/posts a message indicating a new request is received. In response to receiving the message indicating a new request is received and is to be processed, cognitive service 140 interprets the natural language query associated with the request, retrieves the associated data, and generates a visualization.

At 185, cognitive service 140 sends a request to interpret the natural language query to LLM service 150. LLM service 150 may be a cloud service that provides machine learning models, such as large language models (LLMs) as a service. Examples of LLMs provided as a service include ChatGPT or GPT-3 provided by Azure OpenAI, or Bard provided by Google. Other models may be implemented. Cognitive service 140 may send the request to LLM service 150 by posting the user request to LLM service 150 (or a particular LLM provided by LLM service 150). In response to receiving the request to interpret the natural language query, LLM service 150 queries a particular machine learning model to interpret the natural language query. As an example, LLM service 150 infers an intent and context for the natural language query (e.g., LLM service 150 infers what is being asked in the natural language query). Inferring the intent and context may include determining a query intent, a task intent, and/or a design intent. The query intent may include an indication of data that is invoked in connection with obtaining/determining result data and logic to be performed with respect to data. LLM service 150 provides the interpretation of the natural language query (e.g., the query intent, the task intent, and/or the design intent) to cognitive service 140. In response to obtaining the interpretation of the natural language query, cognitive service 140 determines one or more data sources comprising data that corresponds to result data or that is to be used to generate the result data for the natural language query. Cognitive service 140 may determine the one or more data sources based on a query intent obtained from LLM service 150, such as a query intent that identifies a type of data to be analyzed. In response to determining the one or more data sources to be queried, cognitive service 140 generates one or more corresponding requests (e.g., subqueries of the natural language query) to obtain the data (e.g., respective subsets of data) from the one or more data sources. At 186, cognitive service 140 communicates the one or more data requests to data query service 160 and receives data responsive to the one or more requests. Data query service 160 is configured to receive data requests and to manage the querying of identified data sources, retrieval of the data from the data sources, and provide the responsive data to the service that requested the data (e.g., cognitive service 140).

Cognitive service 140 determines the manner to present the data responsive to the natural language query based at least in part on the natural language query and the result data for the query. For example, cognitive service 140 determines a type of visualization to generate based at least in part on one or more of the query intent, the task intent, the design intent, the result data, etc. Cognitive service 140 may determine the visualization to be generated, or the type of visualization to be generated, based on invoking process 1000 of FIG. 10, process 1100 of FIG. 11, and/or process 1300 of FIG. 13. In response to determining the visualization type, cognitive service 140 causes the visualization to be rendered. Cognitive service 140 may directly render the visualization or invoke another application or service to generate the visualization. In response to the rendering of the visualization, at 187, cognitive service 140 stores the result (e.g., the visualization and/or UI recommendation) in association with the user, such as in the table used to track the user conversations/interactions. At 188, DataService API server 120 obtains the results to the natural language query, such as the generated visualization, a user interface (or configurations for a user interface to be presented to the user with the visualization), etc. At 189, DataService API server 120 renders the results (e.g., the generated visualization) and provides the results to client system 110.

Figure 2:
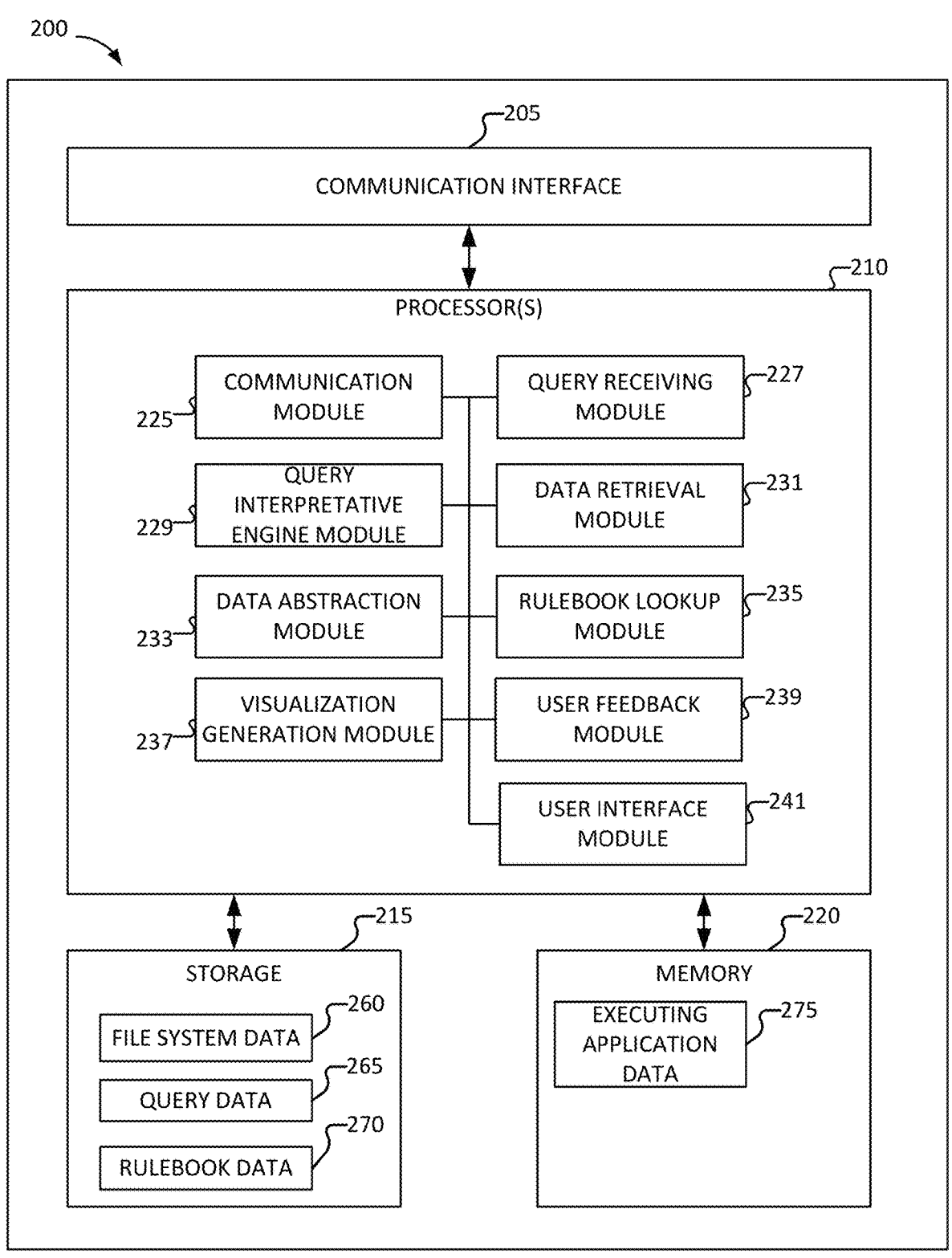
FIG. 2 is a block diagram of a system for generating data visualizations according to various embodiments.

FIG. 2 is a block diagram of a system for generating data visualizations according to various embodiments. In some embodiments, system 200 is implemented in connection with at least part of system 100 of FIG. 1. In some embodiments, system 200 implements at least part of process 1000 of FIG. 10, process 1400 of FIG. 14, process 1500 of FIG. 15, process 1600 of FIG. 16, process 1700 of FIG. 17, process 1800 of FIG. 18, process 1900 of FIG. 19, process 2300 of FIG. 23, and/or process 2400 of FIG. 24. System 200 may be implemented by a cloud service (e.g., a set of one or more cloud resources that provide a service to a user, such as providing visualizations to users).

In some embodiments, system 200 implements cognitive service 140 of system 100.

In the example shown, system 200 implements one or more modules in connection with interpreting natural language queries and providing visualizations based on the natural language queries, etc. System 200 comprises communication interface 205, one or more processors 210, storage 215, and/or memory 220. One or more processors 210 comprises one or more of communication module 225, query receiving module 227, query interpretive engine module 229, data retrieval module 231, data abstraction module 233, rule lookup module 235, visualization generation module 237, user feedback module 239, and/or user interface module 241.

In some embodiments, system 200 comprises communication module 225. System 200 uses communication module 225 to communicate with various nodes or end points (e.g., client terminals, firewalls, DNS resolvers, data appliances, other security entities, etc.) or user systems such as an administrator system. For example, communication module 225 provides to communication interface 205 information that is to be communicated (e.g., to another node, security entity, etc.). As another example, communication interface 205 provides to communication module 225 information received by system 200. Communication module 225 is configured to receive a natural language query, a selection of a type of visualization, user feedback for the visualization, etc. Communication module 225 is configured to query third party service(s) or data sources for data that is deemed responsive to a query, such as a subquery for the natural language query. Communication module 225 is further configured to receive one or more settings or configurations from an administrator. Examples of the one or more settings or configurations include configurations of a machine learning model (e.g., a model used to interpret the natural language query), configurations of a visualization, etc.

In some embodiments, system 200 comprises query receiving module 227. System 200 uses query receiving module 227 to receive a user input. The user input includes a natural language query, such as a query input by a user to a user interface, such as a user interface configured by user interface module 241.

In some embodiments, system 200 comprises query interpretive engine module 229. System 200 uses query interpretive engine module 229 to interpret a query, such as a natural language query received by query receiving module 227. Query interpretative engine module 229 is configured to infer an intent or context for the natural language query. For example, query interpretive engine module 229 determines a query intent (e.g., an indication of data to obtain and/or logic to perform to provide result data for the query), a task intent, and/or a design intent.

Query interpretive engine module 229 queries a machine learning model based on the natural language query. In some embodiments, the machine learning model is a large language model (LLM) such as a generic LLM model, for example ChatGPT, GPT-3, Bard, etc. The LLM analyzes the natural language query and determines the intent and context.

In some embodiments, query interpretive engine module 229 determines tasks for a natural language query. For example, query interpretive engine module 229 further abstracts task(s) for the corresponding natural language query. For example, query interpretive engine module 229 determines a set of corresponding domain-specific tasks. Examples of domain-specific tasks associated with the natural language query may include: (i) did more incidents occur yesterday, (ii) which day had the highest incidents this week, and (iii) how did the number of incidents change during the last week. The system may abstract the set of domain-specific tasks to a set of abstracted tasks: (i) compare values, (ii) locate outliers, and (iii) discover distribution.

In some embodiments, query interpretive engine module 229 determines design criteria for a visualization to be generated for the natural language query. Query interpretive engine module 229 may further abstract the design intent. The design intent enables a user to define/change design aspects of the desired visualization. Examples of design abstractions for the natural language input include a size, an aspect ratio, a label(s) and/or a legend(s), a color(s) (e.g., a color scheme), an orientation, a scale(s), an accessibility, an interaction, a layout structure, etc. Various other design abstractions may be implemented.

In some embodiments, system 200 comprises data retrieval module 231. System 200 uses data retrieval module 231 to obtain data to be used in connection with generating result data for the natural language query. Data retrieval module 231 is configured to determine a data source(s) from which data is to be retrieved for determining the result data. As an example, data retrieval module 231 determines the data source(s) based on the query intent. For example, system 200 may comprise (or be connected to) a plurality of data sources, and based on the query intent, data retrieval module 231 determines a subset of one or more of the plurality of data sources to query for data (e.g., result data and/or data from which the result data is derived). In response to determining the data source(s), data retrieval module 231 generates one or more requests to be sent to the data source(s) to retrieve the corresponding data. Data retrieval module 231 sends the one or more requests to the data source(s) and correspondingly receives the requested data.

In some embodiments, system 200 comprises data abstraction module 233. System 200 uses data abstraction module 233 to abstract the data retrieved from the one or more data sources. For example, data abstraction module 233 abstracts the result data associated with a natural language query. In some embodiments, abstracting the data includes determining one or more properties or statistics associated with the query. The data abstraction may be configured according to a predefined abstract format.

The data abstraction may correspond to a description of the data based on the properties, such as a high-level description of the data based on the statistics for the data. Examples of statistics for the responsive data include mean, median, standard deviation, range, maximum value, minimum value, number of data elements/records, etc. Various other statistics may be determined and used in connection with generating the data abstraction. In some embodiments, the statistics are selected based on the type of data comprised in the responsive data, the amount of data/records in the responsive data, etc.

In some embodiments, system 200 comprises rulebook lookup module 235. System 200 uses rulebook lookup module 235 to perform a lookup against a rulebook of a set of predefined rules. Rulebook lookup module 235 performs the lookup to determine a rule in the set of predefined rules that matches the data abstraction, or most closely matches the data abstraction.

The rulebook (e.g., stored in rulebook data 270) may comprise a bar rule (e.g., a rule corresponding to a bar chart visualization type), a line rule (e.g., a rule corresponding to a line chart visualization type), a donut rule (e.g., a rule corresponding to a donut visualization type), a map rule (e.g., a rule corresponding to a map visualization type), a sunburst rule (e.g., a rule corresponding to a sunburst visualization type), a parallel sets rule (e.g., a rule corresponding to a parallel sets visualization type), a pie chart rule (e.g., a rule corresponding to a pie chart visualization type), a histogram (e.g., a rule corresponding to a histogram visualization type), a single value (e.g., a rule corresponding to a single value type), a map (e.g., a rule corresponding to a map visualization type), a bubble map (e.g., a rule corresponding to a bubble map visualization type), a time bubble map (e.g., a rule corresponding to a time bubble map visualization type), a pie map (e.g., a rule corresponding to a pie map visualization type), a tree map (e.g., a rule corresponding to a tree visualization type), a sankey (e.g., a rule corresponding to a sankey visualization type), a polar bar chart (e.g., a rule corresponding to a polar bar chart visualization type), a scatter plot (e.g., a rule corresponding to a scatter plot visualization type), a table (e.g., a rule corresponding to a table visualization type). Various other types of visualizations and corresponding rules for the visualization types may be implemented.

The rulebook may include certain rules that match a desired visualization. For example, in the case that the intent is to show a relationship between certain data/variables inferred from the natural language query, the rulebook may include a rule for a scatter chart visualization and a rule for a bubble chart visualization. Upon determining that a relationship between variables is to be visualized, rulebook lookup module 235 may determine a number of variables for which a relationship is to be visualized, and look up a rule(s) (e.g., a rule from the set of rules configured to show a relationship between variables) that matches the number of variables. As an example, in the case of a relationship between two variables to be visualized, the selected visualization type (e.g., the rule matching the data abstraction) is a scatter chart. As another example, in the case of a relationship among three variables to be visualized, the selected visualization type is a bubble chart.

The rulebook may comprise a rules hierarchy with which rulebook lookup module 235 walks a decision tree. A first level of the rules hierarchy may include determining whether the desired visualization is a relationship, a comparison, a distribution, or a composition. In response to determining the desired visualization, rulebook lookup module 235 determines the rules to be assessed for the desired visualization.

In some embodiments, in response to determining that the desired visualization is a comparison, the rules hierarchy includes determining whether the comparison is among items or over time.

In response to determining that the comparison is among items, the rules hierarchy includes determining a number of variables per item to be compared. If the number of variables is two variables per item, the rule matching the data abstraction is a variable width volume chart. In response to determining that the comparison among items includes one variable per item, the rules hierarchy includes determining whether the data comprises many categories or a few categories. In response to determining that the data comprises many categories, the rule matching the data abstraction is a table or a table with embedded charts. Conversely, in response to determining that the data comprises a few categories, the rules hierarchy includes determining whether the data comprises many items or a few items. If the data comprises many items, the rule matching the data abstraction is a bar chart. If the data comprises a few items, the rule matching the data abstraction is a column chart. The number of categories to be deemed many categories or few categories may be predefined, such as by user preference. Similarly, the number of items to be deemed many items or few items may be predefined.

In response to determining that the comparison is over time, the rules hierarchy includes determining whether the time over which the comparison is to be made is many periods or a few periods. The number of periods to be deemed many periods or few periods may be predefined, such as by user preference. In response to determining that the time includes many periods, the rules hierarchy includes determining whether the data is cyclical or non-cyclical. In response to determining that the data is cyclical, the rule matching the data abstraction corresponds to a circular area chart. Conversely, in response to determining that the data is non-cyclical, the rule matching the data abstraction corresponds to a line chart. In response to determining that the time includes a few periods, the rules hierarchy includes determining whether the data comprises a single or a few categories, or whether the data comprises many categories. The number of categories to be deemed many categories or few categories may be predefined, such as by user preference. In response to determining that the number of categories is a single category or a few categories, the rule matching the data abstraction corresponds to a column chart (e.g., a visualization type=a column chart). Conversely, in response to determining that the data comprises many categories, the rule matching the data abstraction corresponds to a line chart.

In response to determining that a distribution of data is to be visualized, the rules hierarchy includes determining whether a number of variables is one variable, two variables, or three variables. In response to determining that the number of variables is a single variable, the rules hierarchy includes determining whether the data includes few data points or many data points. The number of data points to be deemed many data points or few data points may be predefined, such as by user preference. In response to determining that the data comprises a few data points, the rule matching the data abstraction is deemed to be a rule for a column histogram visualization. Conversely, in response to determining that the data comprises many data points, the rule matching the data abstraction is deemed to be a rule for a line histogram visualization. If data is determined to comprise two variables, the rule matching the data abstraction is deemed to be a rule for a scatter plot visualization. If the data is determined to comprise three variables, the rule matching the data abstraction is deemed to be a rule for a 3D area chart.

In response to determining that a composition of the data is to be visualized, the rules hierarchy includes determining whether the data composition is static or changing over time.

In response to determining that the data composition is static, the rules hierarchy includes determining a simple share of total is to be visualized, an accumulation or subtraction to total is to be visualized, or a component of components is to be visualized. In response to determining that a simple share of total is to be visualized, the rule matching the data abstraction is deemed to be a rule for a pie chart visualization. In response to determining that an accumulation or subtraction to total is to be visualized, the rule matching the data abstraction is deemed to be a rule for a waterfall chart visualization. In response to determining that a component of components is to be visualized, the rule matching the data abstraction is deemed to be a rule for a stacked 100% column chart with subcomponents visualization.

In response to determining that the data composition is changing over time, the rules hierarchy includes determining whether the data includes a few periods or many periods. The number of periods to be deemed many periods or few periods may be predefined, such as by user preference. In response to determining that the data comprises many periods, the rules hierarchy includes determining whether only relative differences between data composition matter, or whether relative and absolute differences of data composition matter. In response to determining that only relative differences between data composition matter, the rule matching the data abstraction is deemed to be a rule for stacked 100% chart visualization. In response to determining that relative and absolute differences between data composition matter, the rule matching the data abstraction is deemed to be a rule for a stacked area chart visualization. In response to determining that the data comprises a few periods, the rules hierarchy includes determining whether only relative differences between data composition matters, or whether relative and absolute differences of data composition matter. In response to determining that only relative differences between data composition matter, the rule matching the data abstraction is deemed to be a rule for a stacked 100% column chart visualization. In response to determining that relative and absolute differences between data composition matter, the rule matching the data abstraction is deemed to be a rule for a stacked column chart visualization.

The rulebook may comprise various other rules hierarchies or rules for selecting a visualization type.

In some embodiments, system 200 comprises visualization generation module 237. System 200 uses visualization generation module 237 to generate a visualization based on the visualization type corresponding to the rule deemed to match the data abstraction.

In some embodiments, visualization generation module 237 generates a visualization definition. In some embodiments, the visualization definition is generated in a data visualization language that is a high-level language that is proximate to natural language. For example, the visualization definition is a high-level description of the visualization, such as a representation of the requested visualization in a language that is proximate to natural language. Visualization generation module 237 generates the visualization definition based on one or more of the data abstraction, the task abstraction, the design abstraction, and the rule identified by rulebook lookup module 235. In some embodiments, the visualization definition comprises an indication of a first dimension of data to be visualized, a second dimension of the data to be visualized, and a type of visualization. The visualization may be multi-dimensional (e.g., n dimensions, where n is a positive integer). Accordingly, the visualization may include an indication of other dimensions of data to be visualized.

In response to determining the visualization definition, visualization generation module 237 generates the visualization or causes the visualization to be generated. For example, visualization generation module 237 directly generates the visualization from the visualization definition. As another example, visualization generation module 237 invokes another application or service to generate and provide the visualization based at least in part on the visualization definition. Generating the visualization may include translating the visualization definition to another language, such as a language associated with a particular visualization type to be generated or the language used by the associated application/service to be invoked to generate the visualization.

In some embodiments, system 200 comprises user feedback module 239. System 200 uses user feedback module 239 to receive user feedback pertaining to whether the visualization provided in response to the natural language query is correct, appealing, or helpful, etc. User feedback module 239 may use user interface module 241 to prompt the user to provide feedback. A developer can use the feedback in connection with updating the rulebook (e.g., the rules hierarchy) or a decision tree to update a visualization type with a particular set of properties or statistics in a data abstraction.

In some embodiments, system 200 comprises user interface module 241. System 200 uses user interface module 241 to configure and provide a user interface to a user, such as to a client system used by the user. User interface module 241 configures a user interface to provide the visualization generated in response to the natural language query. Additionally, user interface module 241 may include various input fields or selectable elements with which a user can provide user feedback. In some embodiments, user interface module 241 provides an interface via which a user may select among a plurality of visualization types for a particular natural language query (e.g., in the case that multiple rules match the data abstraction), and in response to receiving a user selection, system 200 uses visualization generation module 237 to generate the visualization in accordance with the selected visualization type.

According to various embodiments, storage 215 comprises one or more of filesystem data 260, query data 265, and rulebook data 270. Storage 215 comprises a shared storage (e.g., a network storage system) and/or database data, and/or user activity data.

In some embodiments, filesystem data 260 comprises a database such as one or more datasets (e.g., one or more datasets for domains, datasets comprising samples of network traffic, datasets comprising sample classifications, datasets of security events/lapses, mappings of indications for network traffic or predicted traffic classifications for network traffic to the network traffic or hashes, signatures or other unique identifiers of the network traffic, such as a signature for the domains, mappings of indicators of benign traffic to hashes, signatures or network traffic, etc.).

Query data 265 comprises information pertaining to one or more natural language queries that are received by system 200. For example, query data 265 stores the natural language query received by query receiving module 227. In some embodiments, query data 265 comprises a query intent, task intent, design intent, and/or result data corresponding to a natural language query. Query data 265 may optionally store historical query data, such as result data, visualization data, and intent data for previously processed queries.

Rulebook data 270 comprises information pertaining to one or more rules for determining a visualization type. Rulebook data 270 may comprise a rules hierarchy or decision tree that is walked to determine a rule (e.g., a visualization type) matching a data abstraction. Rulebook data 270 may comprise user feedback with respect to visualization types or visualization definitions for a particular data abstraction, query (e.g., query intent, task intent, etc.), etc.

According to various embodiments, memory 220 comprises executing application data 275. Executing application data 275 comprises data obtained or used in connection with executing an application such as an application to determine or predict whether a certain sample corresponds to malicious traffic or benign traffic, an application to extract information from webpage content, an input string, an application to extract information from a file, or other sample, etc. In embodiments, the application comprises one or more applications that perform one or more of receive and/or execute a query or task, generate a report and/or configure information that is responsive to an executed query or task, and/or provide to a user information that is responsive to a query or task. Other applications comprise any other appropriate applications (e.g., an index maintenance application, a communications application, a machine learning model application, an application for detecting suspicious input strings, suspicious files, an application for detecting suspicious or unparked domains, an application for detecting malicious network traffic or malicious/non-compliant applications such as with respect to a corporate security policy, a document preparation application, a report preparation application, a user interface application, a data analysis application, an anomaly detection application, a user authentication application, a security policy management/update application, etc.).

Figure 3:
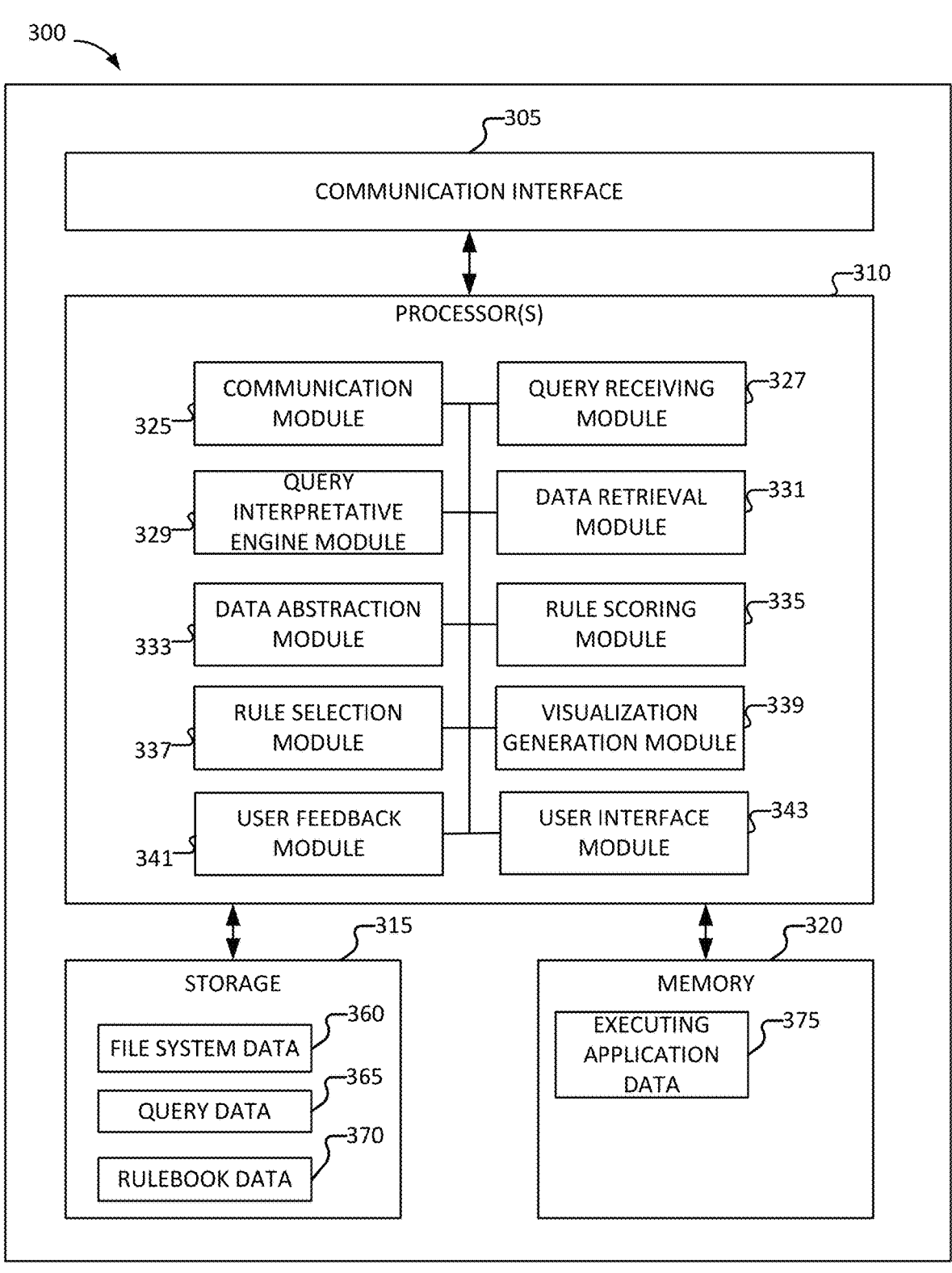
FIG. 3 is a block diagram of a system for generating data visualizations according to various embodiments.

FIG. 3 is a block diagram of a system for generating data visualizations according to various embodiments. In some embodiments, system 300 is implemented in connection with at least part of system 100 of FIG. 1. In some embodiments, system 300 implements at least part of process 1100 of FIG. 11, process 1200 of FIG. 12, process 1400 of FIG. 14, process 1500 of FIG. 15, process 1600 of FIG. 16, process 1700 of FIG. 17, process 1800 of FIG. 18, process 2000 of FIG. 20, process 2300 of FIG. 23, and/or process 2400 of FIG. 24. System 300 may be implemented by a cloud service (e.g., a set of one or more cloud resources that provide a service to a user, such as providing visualizations to users).

In some embodiments, system 300 implements cognitive service 140 of system 100.

In the example shown, system 300 implements one or more modules in connection with interpreting natural language queries and providing visualizations based on the natural language queries, etc. System 300 comprises communication interface 305, one or more processors 310, storage 315, and/or memory 320. One or more processors 310 comprises one or more of communication module 325, query receiving module 327, query interpretive engine module 329, data retrieval module 331, data abstraction module 333, rule scoring module 235, rule selection module 337, visualization generation module 339, user feedback module 341, and/or user interface module 343.

In some embodiments, system 300 comprises communication module 325. System 300 uses communication module 325 to communicate with various nodes or end points (e.g., client terminals, firewalls, DNS resolvers, data appliances, other security entities, etc.) or user systems such as an administrator system. For example, communication module 325 provides to communication interface 305 information that is to be communicated (e.g., to another node, security entity, etc.). As another example, communication interface 305 provides to communication module 325 information received by system 300. Communication module 325 is configured to receive a natural language query, a selection of a type of visualization, user feedback for the visualization, etc. Communication module 325 is configured to query third party service(s) or data sources for data that is deemed responsive to a query, such as a subquery for the natural language query. Communication module 325 is further configured to receive one or more settings or configurations from an administrator. Examples of the one or more settings or configurations include configurations of a machine learning model (e.g., a model used to interpret the natural language query), configurations of a visualization, etc.

In some embodiments, system 300 comprises query receiving module 327. System 300 uses query receiving module 327 to receive a user input. The user input includes a natural language query, such as a query input by a user to a user interface. Query receiving module 327 may correspond to, or be similar to, query receiving module 227 of system 200.

In some embodiments, system 300 comprises query interpretive engine module 329. System 300 uses query interpretive engine module 329 to interpret a query, such as a natural language query received by query receiving module 327. Query interpretive engine module 329 may correspond to, or be similar to, query interpretive engine module 229 of system 200.

In some embodiments, system 300 comprises data retrieval module 331. System 300 uses data retrieval module 331 to obtain data to be used in connection with generating result data for the natural language query. Data retrieval module 331 may correspond to, or be similar to, data retrieval module 231 of system 200.

In some embodiments, system 300 comprises data abstraction module 333. System 300 uses data abstraction module 333 to abstract the data retrieved from the one or more data sources. Data abstraction module 333 may correspond to, or be similar to, data abstraction module 233 of system 200.

In some embodiments, system 300 comprises rule scoring module 335. System 300 uses rule scoring module 335 to score a rule for visualizing result data for a natural language query. Rule scoring module 335 may rank the rules for visualizing the result data, such as according to a score (e.g., an aggregate score for a plurality of scoring criteria), etc. Examples of scoring criteria include a compatibility, a coverage, a fanciness, a user preference, etc.

Figure 12:
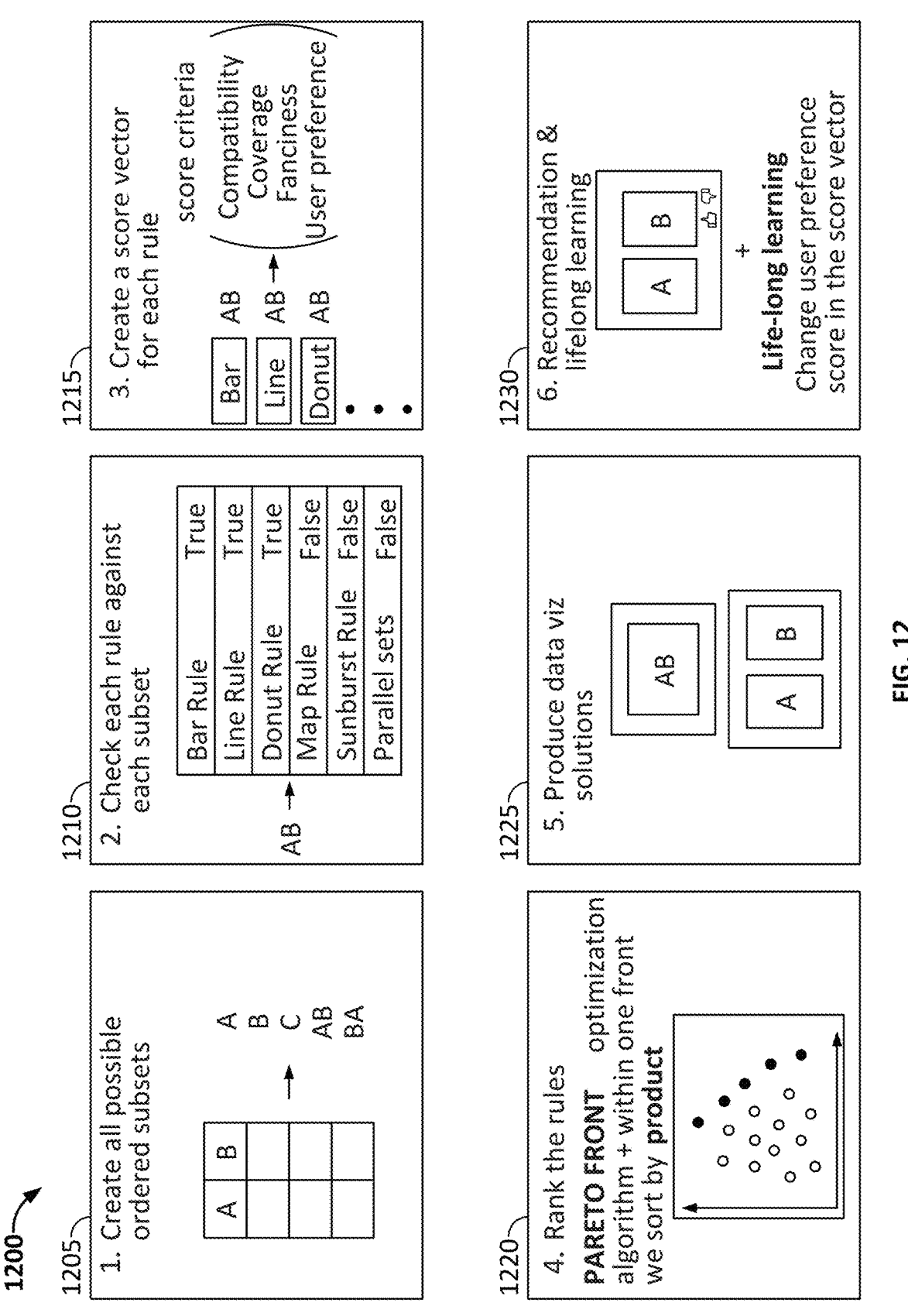
FIG. 12 illustrates a process for determining a visualization type according to various embodiments.

In some embodiments, scoring the rules for visualizing the result data (e.g., the data summarized/represented by the data abstraction) includes invoking process 1200 of FIG. 12. For example, rule scoring module 335 determines all possible ordered subsets in the result data, checks each of the predefined rules (e.g., the rules in the rulebook) against each subset of data, and creates a score vector for each rule. The score vector may be created along dimensions defined by the scoring criteria. In response to determining the score vector for each rule, the rules are ranked, such as by a pareto front optimization.

In some embodiments, system 300 comprises rule selection module 337. System 300 uses rule selection module 337 to select the rule matching, or most closely matching, the result data represented/summarized by the data abstraction. For example, rule selection module 337 selects a rule corresponding to a data point on the pareto front after performing a pareto front optimization algorithm on the score vectors for each rule.

In some embodiments, system 300 comprises visualization generation module 339. System 300 uses visualization generation module 339 to generate a visualization based on the visualization type corresponding to the rule deemed to match the data abstraction. The rule deemed to match the data abstraction is the rule selected by rule selection module 337 (e.g., the rule having the highest ranking). Visualization generation module 339 may correspond to, or be similar to, visualization generation module 237 of system 200.

In some embodiments, system 300 comprises user feedback module 341. System 300 uses user feedback module 341 to obtain user feedback for the visualization provided in response to the natural language query. User feedback module 341 may correspond to, or be similar to, user feedback module 239 of system 200.

In some embodiments, system 300 uses the user feedback to update a user preference score in the associated score vector(s).

In some embodiments, system 300 comprises user interface module 343. System 300 uses user interface module 343 to configure and provide a user interface to a user, such as to a client system used by the user. User interface module 343 may correspond to, or be similar to, user interface module 241 of system 200.

According to various embodiments, storage 315 comprises one or more of filesystem data 360, query data 365, and rulebook data 370. Storage 315 comprises a shared storage (e.g., a network storage system) and/or database data, and/or user activity data.

In some embodiments, filesystem data 360 comprises a database such as one or more datasets (e.g., one or more datasets for domains, datasets comprising samples of network traffic, datasets comprising sample classifications, datasets of security events/lapses, mappings of indications for network traffic or predicted traffic classifications for network traffic to the network traffic or hashes, signatures or other unique identifiers of the network traffic, such as a signature for the domains, mappings of indicators of benign traffic to hashes, signatures or network traffic, etc.).

Query data 365 comprises information pertaining to one or more natural language queries that are received by system 300. For example, query data 365 stores the natural language query received by query receiving module 327. In some embodiments, query data 365 comprises a query intent, task intent, design intent, and/or result data corresponding to a natural language query. Query data 365 may optionally store historical query data, such as result data, visualization data, and intent data for previously processed queries.

Rulebook data 370 comprises information pertaining to one or more rules for determining a visualization type. Rulebook data 370 may comprise a rules hierarchy or decision tree that is walked to determine a rule (e.g., a visualization type) matching a data abstraction. Rulebook data 370 may comprise user feedback with respect to visualization types or visualization definitions for a particular data abstraction, query (e.g., query intent, task intent, etc.), etc. Rulebook data 370 may store user preference values for rules, which may be updated in the associated score vector for use of a rule with respect to an ordered subset of data.

According to various embodiments, memory 320 comprises executing application data 375. Executing application data 375 comprises data obtained or used in connection with executing an application such as an application to determine or predict whether a certain sample corresponds to malicious traffic or benign traffic, an application to extract information from webpage content, an input string, an application to extract information from a file, or other sample, etc. In embodiments, the application comprises one or more applications that perform one or more of receive and/or execute a query or task, generate a report and/or configure information that is responsive to an executed query or task, and/or provide to a user information that is responsive to a query or task. Other applications comprise any other appropriate applications (e.g., an index maintenance application, a communications application, a machine learning model application, an application for detecting suspicious input strings, suspicious files, an application for detecting suspicious or unparked domains, an application for detecting malicious network traffic or malicious/non-compliant applications such as with respect to a corporate security policy, a document preparation application, a report preparation application, a user interface application, a data analysis application, an anomaly detection application, a user authentication application, a security policy management/update application, etc.).

Figure 4:
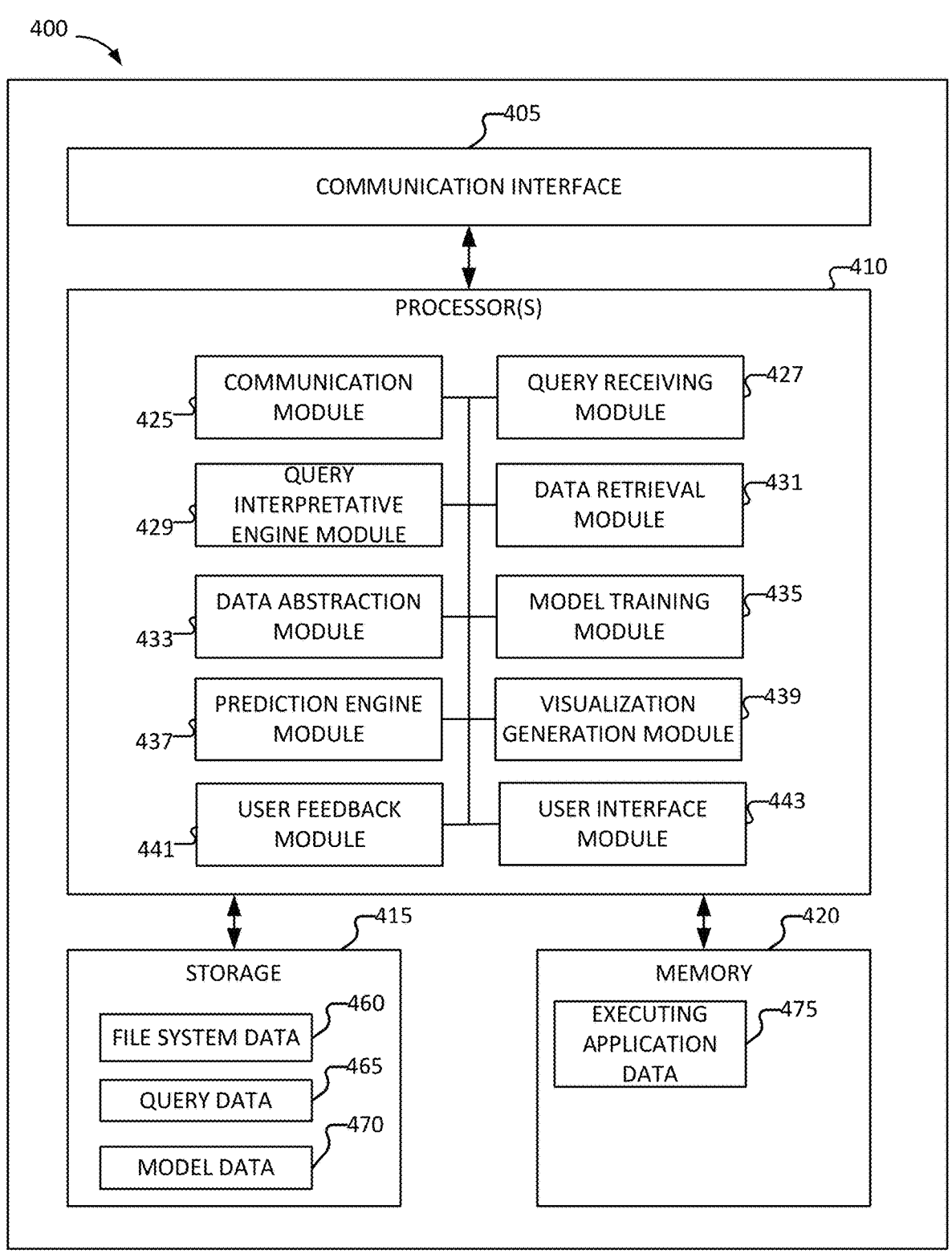
FIG. 4 is a block diagram of a system for generating data visualizations according to various embodiments.

FIG. 4 is a block diagram of a system for generating data visualizations according to various embodiments. In some embodiments, system 400 is implemented in connection with at least part of system 100 of FIG. 1. In some embodiments, system 400 implements at least part of process 1300 of FIG. 13, process 1500 of FIG. 15, process 1600 of FIG. 16, process 1700 of FIG. 17, process 1800 of FIG. 18, process 2200 of FIG. 22, process 2300 of FIG. 23, and/or process 2400 of FIG. 24. System 400 may be implemented by a cloud service (e.g., a set of one or more cloud resources that provide a service to a user, such as providing visualizations to users).

In some embodiments, system 400 implements cognitive service 140 of system 100.

In the example shown, system 400 implements one or more modules in connection with interpreting natural language queries and providing visualizations based on the natural language queries, etc. System 400 comprises communication interface 405, one or more processors 410, storage 415, and/or memory 420. One or more processors 410 comprises one or more of communication module 425, query receiving module 427, query interpretive engine module 429, data retrieval module 431, data abstraction module 433, model training module 435, prediction engine module 437, visualization generation module 439, user feedback module 441, and/or user interface module 443.

In some embodiments, system 400 comprises communication module 425. System 400 uses communication module 425 to communicate with various nodes or end points (e.g., client terminals, firewalls, DNS resolvers, data appliances, other security entities, etc.) or user systems such as an administrator system. For example, communication module 425 provides to communication interface 405 information that is to be communicated (e.g., to another node, security entity, etc.). As another example, communication interface 405 provides to communication module 425 information received by system 400. Communication module 425 is configured to receive a natural language query, a selection of a type of visualization, user feedback for the visualization, etc. Communication module 425 is configured to query third party service(s) or data sources for data that is deemed responsive to a query, such as a subquery for the natural language query. Communication module 425 is further configured to receive one or more settings or configurations from an administrator. Examples of the one or more settings or configurations include configurations of a machine learning model (e.g., a model used to interpret the natural language query), configurations of a visualization, etc.

In some embodiments, system 400 comprises query receiving module 427. System 400 uses query receiving module 427 to receive a user input. The user input includes a natural language query, such as a query input by a user to a user interface. Query receiving module 427 may correspond to, or be similar to, query receiving module 227 of system 200.

In some embodiments, system 400 comprises query interpretive engine module 429. System 400 uses query interpretive engine module 429 to interpret a query, such as a natural language query received by query receiving module 427. Query interpretive engine module 429 may correspond to, or be similar to, query interpretive engine module 229 of system 200.

In some embodiments, system 400 comprises data retrieval module 431. System 400 uses data retrieval module 431 to obtain data to be used in connection with generating result data for the natural language query. Data retrieval module 431 may correspond to, or be similar to, data retrieval module 231 of system 200.

In some embodiments, system 400 comprises data abstraction module 433. System 400 uses data abstraction module 433 to abstract the data retrieved from the one or more data sources. Data abstraction module 433 may correspond to, or be similar to, data abstraction module 233 of system 200.

In some embodiments, system 400 comprises model training module 435. System 400 uses model training module 435 to train a machine learning model(s). Model training module 435 may train or otherwise obtain a model for interpreting a natural language query. For example, model training module 435 trains a large language model to infer the query intent, task intent, and/or design intent from a natural language model. The model used to interpret the natural language query may also be used to predict a visualization type or generate a predicted visualization definition.

In some embodiments, the model for predicting a visualization type or generating a predicted visualization definition is different from the model used to interpret the natural language query. As an example, model training module 435 may train a model specifically for predicting a visualization type based on one or more of a data abstraction, a query intent, a task intent, and/or a design intent. As another example, model training module 435 may train a model specifically for predicting a visualization definition based on one or more of a data abstraction, a query intent, a task intent, and/or a design intent.

In some embodiments, system 400 comprises prediction engine module 437. System 400 uses prediction engine module 437 to implement the model to obtain a predicted visualization definition based on one or more of a data abstraction, a query intent, a task intent, and/or a design intent. Alternatively, prediction engine module 437 queries the model for a predicted visualization type for system 200 to use to generate a corresponding visualization definition based on one or more of a data abstraction, a query intent, a task intent, and/or a design intent.

In some embodiments, system 400 comprises visualization generation module 439. System 400 uses visualization generation module 439 to generate a visualization based on the visualization type corresponding to the rule deemed to match the data abstraction. Visualization generation module 439 may correspond to, or be similar to, visualization generation module 237 of system 200.

In some embodiments, system 400 comprises user feedback module 441. System 400 uses user feedback module 441 to obtain user feedback for the visualization provided in response to the natural language query. User feedback module 441 may correspond to, or be similar to, user feedback module 239 of system 200.

In some embodiments, system 400 comprises user interface module 443. System 400 uses user interface module 443 to configure and provide a user interface to a user, such as to a client system used by the user. User interface module 443 may correspond to, or be similar to, user interface module 241 of system 200.

According to various embodiments, storage 415 comprises one or more of filesystem data 460, query data 465, and model data 470. Storage 415 comprises a shared storage (e.g., a network storage system) and/or database data, and/or user activity data.

In some embodiments, filesystem data 460 comprises a database such as one or more datasets (e.g., one or more datasets for domains, datasets comprising samples of network traffic, datasets comprising sample classifications, datasets of security events/lapses, mappings of indications for network traffic or predicted traffic classifications for network traffic to the network traffic or hashes, signatures or other unique identifiers of the network traffic, such as a signature for the domains, mappings of indicators of benign traffic to hashes, signatures or network traffic, etc.).

Query data 465 comprises information pertaining to one or more natural language queries that are received by system 400. For example, query data 465 stores the natural language query received by query receiving module 427. In some embodiments, query data 465 comprises a query intent, task intent, design intent, and/or result data corresponding to a natural language query. Query data 465 may optionally store historical query data, such as result data, visualization data, and intent data for previously processed queries.

Model data 470 comprises information pertaining to one or more models used to predict a visualization type or a visualization definition. Model data 470 may comprise historical predictions of visualization types or visualization definitions. As an example, model data 470 stores the historical predictions in association with a natural language query, or one or more of a query intent, a data abstraction, a task abstraction, and/or a design abstraction. Model data 470 may comprise the model used to generate the prediction, and/or embeddings or feature vectors used to generate predictions with the model. In some embodiments, model data 470 comprises a machine learning model to interpret a natural language query (e.g., to infer an intent/context for the query). For example, model data 470 comprises a large language model (e.g., GPT-3, GPT-4, ChatGPT, Bard, etc.).

According to various embodiments, memory 420 comprises executing application data 475. Executing application data 475 comprises data obtained or used in connection with executing an application such as an application to determine or predict whether a certain sample corresponds to malicious traffic or benign traffic, an application to extract information from webpage content, an input string, an application to extract information from a file, or other sample, etc. In embodiments, the application comprises one or more applications that perform one or more of receive and/or execute a query or task, generate a report and/or configure information that is responsive to an executed query or task, and/or provide to a user information that is responsive to a query or task. Other applications comprise any other appropriate applications (e.g., an index maintenance application, a communications application, a machine learning model application, an application for detecting suspicious input strings, suspicious files, an application for detecting suspicious or unparked domains, an application for detecting malicious network traffic or malicious/non-compliant applications such as with respect to a corporate security policy, a document preparation application, a report preparation application, a user interface application, a data analysis application, an anomaly detection application, a user authentication application, a security policy management/update application, etc.).

Figure 5:
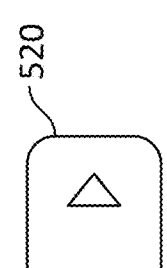
FIG. 5 is an example of determining a visualization definition based on natural language user input according to various embodiments.
Figure 5:
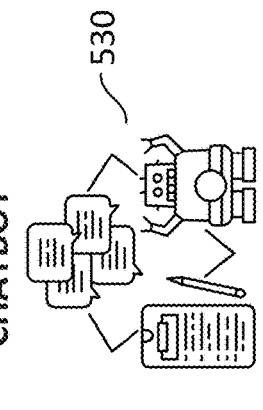
Figure 5:
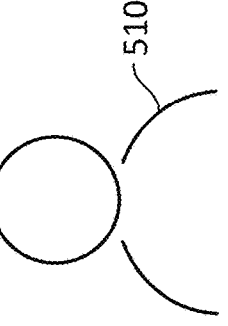

FIG. 5 is an example of determining a visualization definition based on natural language user input according to various embodiments. System 500 receives a natural language query and generates a visualization definition, which may be thereafter used to generate a visualization. User 510 provides to system 500 a natural language query. User 510 may use a client terminal to communicate the natural language query. As an example, user 510 inputs the natural language query to user interface 520 presented to the client terminal used by user 510. In response to receiving the natural language query (e.g., "I would like to see the number of incidents over last week in the USA"), system 500 provides the natural language query to cognitive service 530 to generate visualization definition 540 that defines the visualization to be provided in response to the natural language query. System 500 may additionally generate the visualization based on the visualization definition.

In some embodiments, cognitive service 530 analyzes the natural language query, queries one or more models based at least in part on the natural language query, and generates the visualization definition.

In response to receiving the natural language query, cognitive service 530 determines a query intent, which may include one or more of a data intent, a task intent, and a design intent. Determining the query intent includes querying a machine learning model, such as a large language model, to interpret the natural language query to obtain the query intent. Various other machine learning models may be used to determine the query intent.

In response to determining the query intent, cognitive service 530 determines one or more requests (e.g., one or more queries) to obtain data responsive to the natural language query. System 500 determines a set of one or more data sources that stores the data responsive to the query (e.g., the data identified in the query intent) and generates the one or more requests based on the set of one or more data sources. Cognitive service 530 communicates the one or more requests to the corresponding data source(s) to obtain responsive data.

In response to obtaining the responsive data, cognitive service 530 analyzes the data and abstracts the responsive data to obtain a data abstraction. The data abstraction may be a high-level description of one or more properties/characteristics of the data. The data abstraction may be a summary of statistics for the data.

In response to obtaining the data abstraction for the responsive data, cognitive service 530 determines a visualization definition for the natural language query based at least in part on the data abstraction. The visualization definition is generated in accordance with a predefined language, such as a data visualization language. In some embodiments, the visualization definition is generated in the data visualization language in a precise and computable manner. The generation of the visualization definition in the data visualization language forces cognitive service 530 to precisely describe the space of all possible visualizations. The data visualization language may be an intermediate language that can be interpreted by a machine learning model such as a large language model (e.g., ChatGPT). For example, the data visualization language is relatively close in proximity to a natural language, thereby enabling interpretation by a large language model.

Cognitive service 530 may determine the visualization definition based at least in part on a rulebook, perform a scoring of rules in a rulebook, or query a model or prediction engine to predict a visualization type from which the visualization definition is generated, or to predict a visualization definition. Using the rulebook may include performing a lookup to determine a rule that matches the natural language query (e.g., the data abstraction performed with respect to result data for the query, the query intent, etc.), and determining the visualization type associated with such rule. Performing a scoring of the rules includes ranking the rules according to a score (e.g., a score determined based on one or more scoring criteria) and selecting the rule having the highest ranking. The visualization type corresponding to the selected rule is used to determine the visualization definition.

Figure 6A:
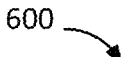
FIG. 6A is an example of a set of data retrieved in connection with a natural language query according to various embodiments.

FIG. 6A is an example of a set of data retrieved in connection with a natural language query according to various embodiments. In the example shown, responsive data 600 comprises a mapping country, time, number of incidents, and device type. The system obtains responsive data 600 for a natural language query. The natural language query is processed to determine the query intent, and the system generates a set of one or more requests to data stores that store the information to be retrieved.

Figure 6B:
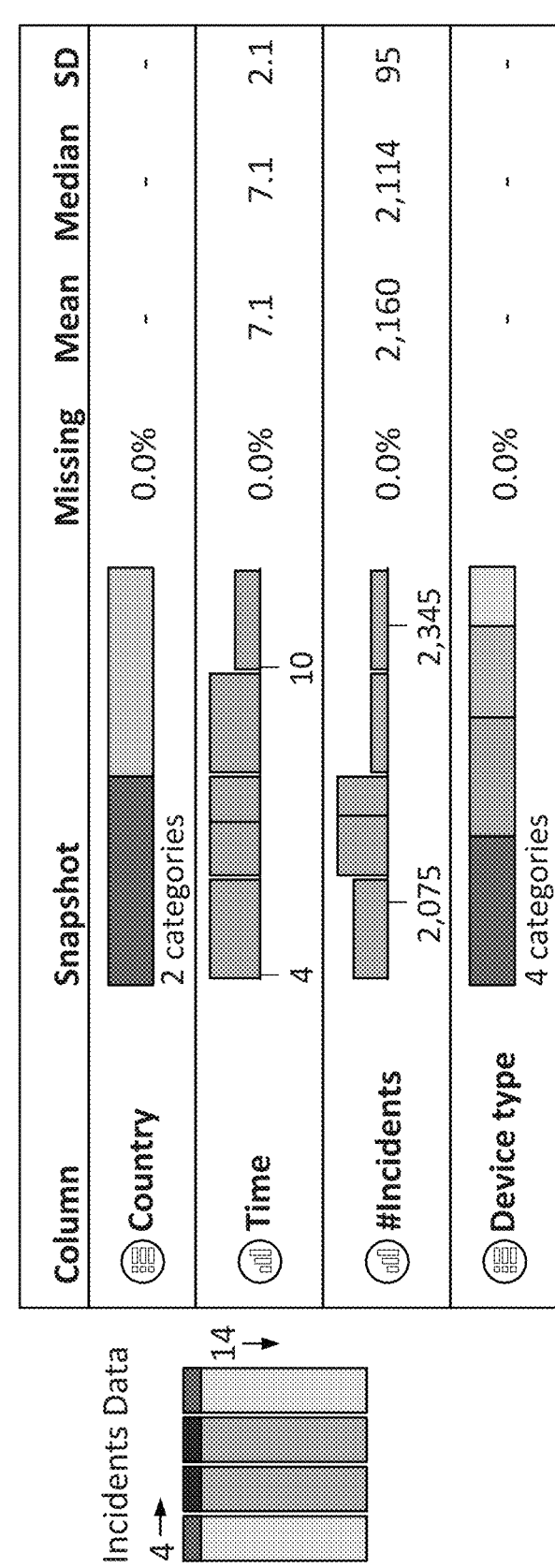
FIG. 6B is an example of a data abstraction performed with respect to the set of data for a query according to various embodiments.

FIG. 6B is an example of a data abstraction performed with respect to the set of data for a query according to various embodiments. In the example shown, the system generates data abstraction 650 for responsive data 600. In some embodiments, generating the data abstraction includes analyzing responsive data 600 and determining one or more properties of the responsive data, such as statistics for responsive data 600. As an example, data abstraction 650 is generated by processing a request for a view of the summary statistics for responsive data 600. In the case of responsive data 600, the request for the view of the summary statistics may include "viewof summary_data=SummaryTable (data, {label: "Incidents Data"})".

Figures 7A, 7B:
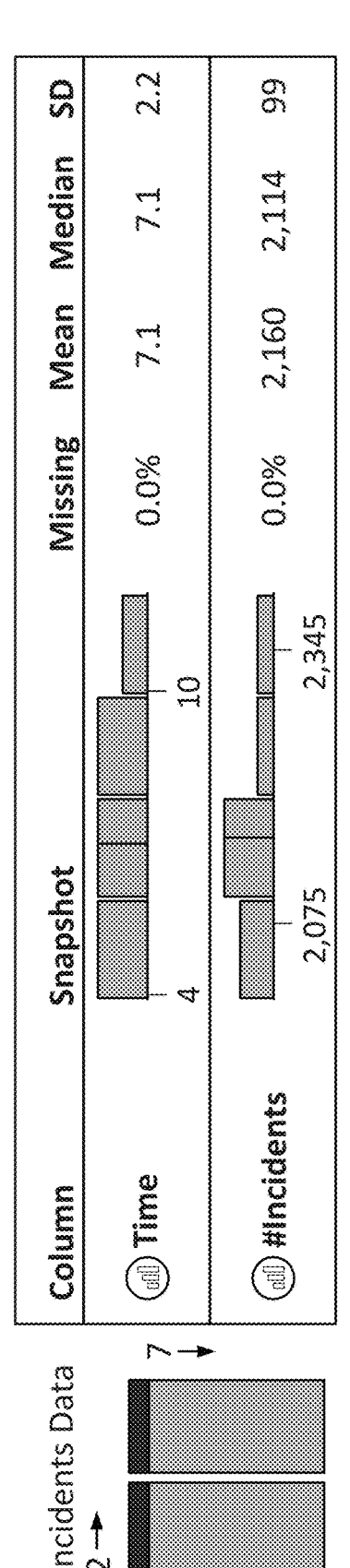
FIG. 7A is an example of a set of data retrieved in connection with a natural language query according to various embodiments.
FIG. 7B is an example of a data abstraction performed with respect to the set of data for a query according to various embodiments.

FIG. 7A is an example of a set of data retrieved in connection with a natural language query according to various embodiments. In the example shown, responsive data 700 comprises a mapping of time and number of incidents (e.g., the number of incidents as a function of time). The system obtains responsive data 700 for a natural language query. The natural language query is processed to determine the query intent, and the system generates a set of one or more requests to data stores that store the information to be retrieved.

FIG. 7B is an example of a data abstraction performed with respect to the set of data for a query according to various embodiments. In the example shown, the system generates data abstraction 750 for responsive data 700. In some embodiments, generating the data abstraction includes analyzing responsive data 700 and determining one or more properties of responsive data, such as statistics for responsive data 700. As an example, data abstraction 750 is generated by processing a request for a view of the summary statistics for responsive data 700. In the case of responsive data 700, the request for the view of the summary statistics may include "viewof summary_data=SummaryTable (data, {label: "Incidents Data"})".

The data abstraction may correspond to a description of the data based on the properties, such as a high-level description of the data based on the statistics for the data. Examples of statistics for the responsive data include mean, median, standard deviation, range, maximum value, minimum value, number of data elements/records, etc. Various other statistics may be determined and used in connection with generating the data abstraction. In some embodiments, the statistics are selected based on the type of data comprised in the responsive data, the amount of data/records in the responsive data, etc.

In some embodiments, the system further abstracts task(s) for the corresponding natural language query. For example, the system determines a set of corresponding domain-specific tasks. Examples of domain-specific tasks associated with the natural language query may include: (i) did more incidents occur yesterday, (ii) which day had the highest incidents this week, and (iii) how did the number of incidents change during the last week. The system may abstract the set of domain-specific tasks to a set of abstracted tasks: (i) compare values, (ii) locate outliers, and (iii) discover distribution.

Figure 8:
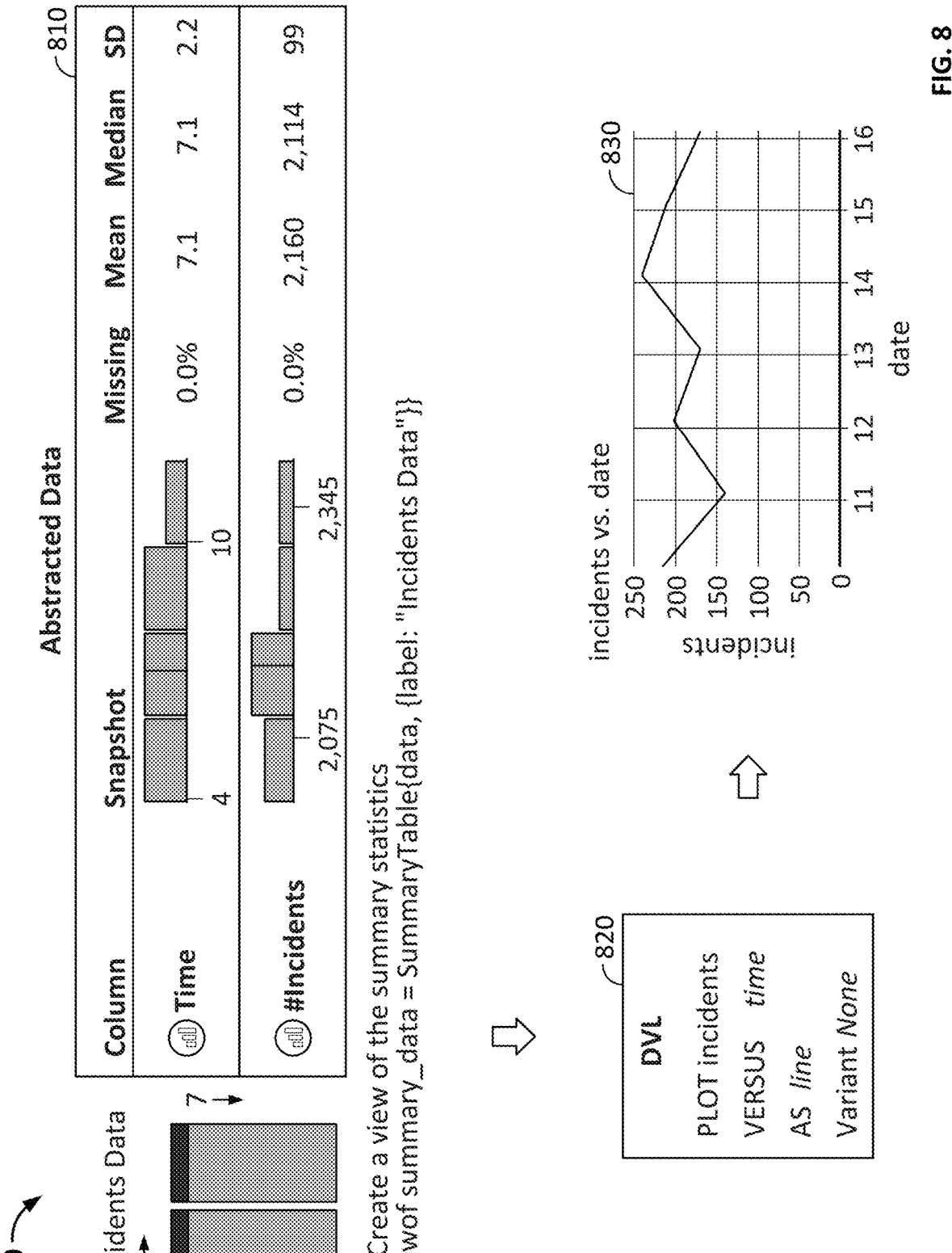
FIG. 8 illustrates a process for generating a visualization according to various embodiments.

FIG. 8 illustrates a process for generating a visualization according to various embodiments. Process 800 is implemented by system 100 of FIG. 1, system 200 of FIG. 2, system 300 of FIG. 3, and/or system 400 of FIG. 4.

At 810, the system obtains a data abstraction for a natural language query. The system obtains the data abstraction based at least in part on abstracting data responsive to the request(s) generated for a particular natural language query.

At 820, the system determines a visualization definition for the abstracted data. The visualization definition may correspond to a description or definition of a visualization in a data visualization language.

In some embodiments, the visualization definition is determined based at least in part on applying a particular rule among a set of predefined rules mapping data abstractions to visualization types. The particular rule may be selected from a rulebook based on one or more decision rules or based on a scoring of the various rules for a particular data abstraction and selecting the highest ranked rule.

In some embodiments, the visualization definition is determined based at least in part on a prediction engine. The prediction engine may comprise a model, such as a machine learning model. In response to determining a data abstraction, the system queries the model for a predicted visualization definition. The model is trained on a training set comprising a set of data abstractions and corresponding visualizations or visualization definitions. The model may additionally be retrained based on user feedback, such as feedback provided in response to the user receiving a data visualization for a particular natural language query, or feedback in the form of selection of a desired visualization when the user is presented with a set of different types of visualizations for the particular natural language query.

At 830, the system generates the visualization. In some embodiments, the system generates the visualization based at least in part on the visualization definition. The system may process the visualization definition in connection with generating the visualization. For example, the system translates the visualization definition (e.g., from a data visualization language) to another high-level language. The other high-level language may be selected based on a type of visualization to be generated, etc.

Figure 9:
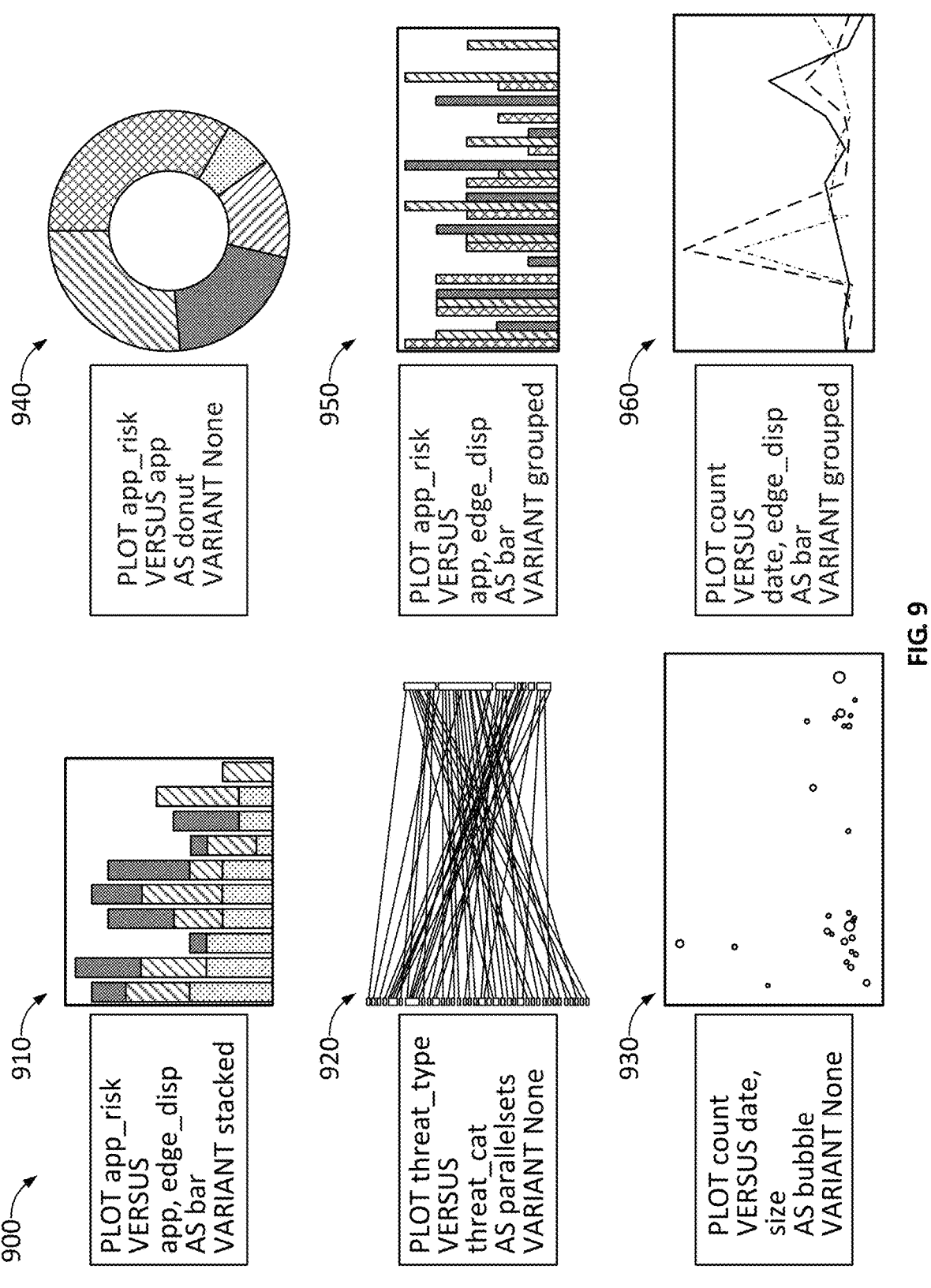
FIG. 9 illustrates examples of visualization definitions and corresponding visualizations according to various embodiments.

FIG. 9 illustrates examples of visualization definitions and corresponding visualizations according to various embodiments. In some embodiments, system 100 of FIG. 1, system 200 of FIG. 2, system 300 of FIG. 3, and/or system 400 of FIG. 4 may generate visualization definitions and corresponding visualizations.

In the example shown, visualization set 900 comprises various examples of types of visualizations that may be generated. Examples of visualization types include bar chart representation 910 (e.g., a representation where the results are stacked in the bar chart along a particular dimension), parallel sets representation 920, bubble chart representation 930, donut representation 940, bar chart 950 (e.g., a representation where separate bars are provided for each variable along a particular dimension), and line graph 960. The visualization definitions illustrated alongside each visualization type are provided in a data visualization language that is relatively high-level and close to natural language. In some implementations, a language model may be used to generate the visualization definition in connection with using a prediction engine that interprets a data abstraction to predict a visualization type to be generated to represent the data, and to generate the visualization definition. In some implementations, a language model is used to generate the visualization definition for a query intent based on a predetermined visualization type (e.g., the visualization type may be selected based on a ruleset or a ranking of rules).

Figure 10:
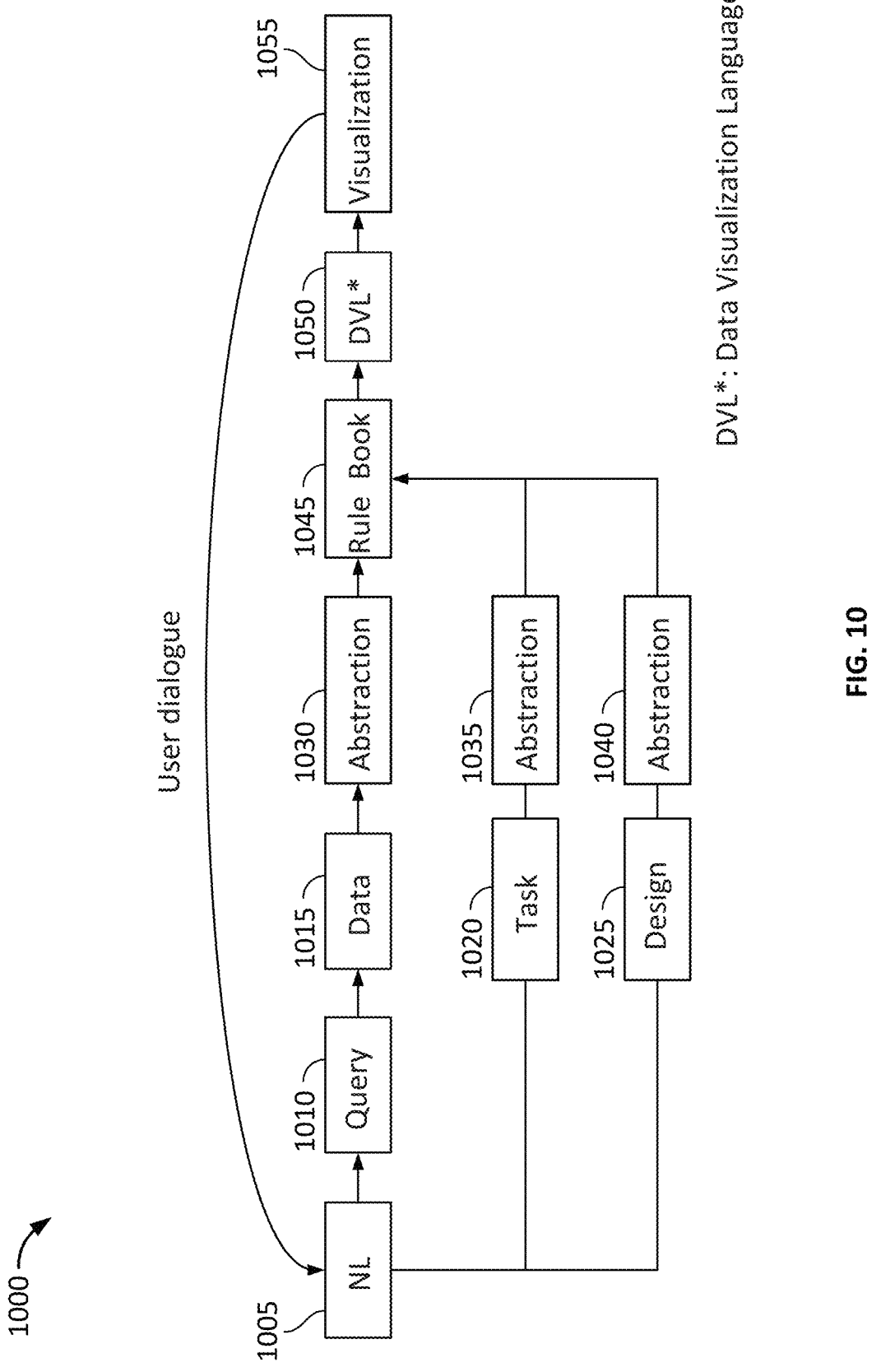
FIG. 10 illustrates a process for generating a visualization according to various embodiments.

FIG. 10 illustrates a process for generating a visualization according to various embodiments. Process 1000 is implemented by system 100 of FIG. 1 and/or system 200 of FIG. 2.

At 1005, a natural language input is received. The input may correspond to a natural language query. In some embodiments, the natural language input is received in a user interface presented to a user on a client device. At 1010, a query intent is determined based on the natural language input. In some embodiments, the system queries a model to interpret the natural language input in connection with determining the query intent. Determining the query intent may include determining a data intent (e.g., determining parameters for data that is responsive to the query). The model is a machine learning model, such as a large language model (LLM) (e.g., GPT-3, ChatGPT, Bard, other LLMs). The model may parse the natural language input to determine the query. For example, the system infers one or more intents or contexts for the visualization, such as a query intent, a task intent, and/or a design intent.

At 1015, the system determines the data that is responsive to the query. In response to determining the query, the system obtains the data that is responsive to the query (e.g., result data). The system may determine a set of one or more data sources that store the data responsive to the query, and in response to determining the set of one or more data sources, the system may obtain the result data from the set of one or more data sources. For example, the system generates one or more requests for corresponding data at the respective data sources in the set of one or more data sources.

At 1020, the system determines a task intent for the natural language input. In some embodiments, the system determines the task intent based on querying a model (e.g., an LLM) to analyze/interpret the natural language input to derive the task intent. The task intent is indicative of the reasons why visualization is being used. Examples of domain-specific tasks that may be derived from the natural language input include (i) "did we have more incidents yesterday?", (ii) "which day had the highest incidents this week?", and (iii) "how did the number of incidents change during the last week?".

At 1025, the system determines a design intent for the natural language input. In some embodiments, the system determines the design intent based on querying a model (e.g., an LLM) to analyze/interpret the natural language input to derive the task intent. The design intent is indicative of elements of the desired visualization, such as labeling, color schemes, etc.

Although process 1000 illustrates 1015, 1020, and 1025 being performed at different steps, the system may use a single query to the LLM to interpret the natural language query and determine the data intent, task intent, and design intent.

After determining the query intent (e.g., the data intent, task intent, and/or design intent), the system performs an abstraction, such as to convert the natural language query to a high-level description of the visualization (e.g., a representation of the visualization in a data visualization language). The high-level description of the visualization (e.g., a visualization definition) may be a representation of the requested visualization in a language that is proximate to natural language. The system precisely describes the space of all possible visualizations based on the query intent. In some embodiments, the system uses the query intent (e.g., performs an abstraction of the query to determine a data intent, a task intent, and/or a design intent) to describe a visualization in a precise and computable manner. In some embodiments, the visualization definition comprises an indication of a first dimension of data to be visualized, a second dimension of the data to be visualized, and a type of visualization. The visualization may be multi-dimensional (e.g., n dimensions, where n is a positive integer). Accordingly, the visualization may include an indication of other dimensions of data to be visualized.

At 1030, the system determines a data abstraction. In some embodiments, the system abstracts the data, such as by determining properties/statistics for data that is responsive to the query. The data abstraction may include determining whether the responsive data is numeric, categorical, hierarchical, multi-dimensional, a time series, a map, etc.

At 1035, the system determines a task abstraction. In some embodiments, the system performs an abstraction with respect to the task intent to determine the task abstraction. Examples of task abstraction include determining that the task intent corresponds to a determination of a distribution, a comparison, a relationship, and/or a composition. Various other task abstractions may be determined. Using the examples of domain specific tasks described in connection with 1020, corresponding task abstractions may include (i) compare values, (ii) locate outliers, and/or (iii) discover a distribution.

At 1040, the system determines a design abstraction. Abstracting the design intent enables a user to define/change design aspects of the desired visualization. Examples of design abstractions for the natural language input include a size, an aspect ratio, a label(s) and/or a legend(s), a color(s) (e.g., a color scheme), an orientation, a scale(s), an accessibility, an interaction, a layout structure, etc. Various other design abstractions may be implemented.

At 1045, the system performs a lookup against a rulebook to determine a rule that matches (or most closely matches) the data abstraction. Alternatively, the system performs a lookup against the rulebook to determine a rule (e.g., corresponding to a particular visualization type) that matches the data abstraction, task abstraction, and design abstraction. The rulebook may comprise a set of predefined rules that correspond to respective visualization types.

At 1050, the system generates a visualization definition (e.g., a representation of the natural language query). In some embodiments, the visualization definition is generated in a data visualization language that is a high-level language that is proximate to natural language. The system generates the visualization definition based on one or more of the data abstraction, the task abstraction, the design abstraction, and the rule identified at 1045. For example, the system uses the visualization type associated with the identified rule to determine the visualization definition. In some embodiments, the visualization definition comprises an indication of a first dimension of data to be visualized, a second dimension of the data to be visualized, and a type of visualization. The visualization may be multi-dimensional (e.g., n dimensions, where n is a positive integer). Accordingly, the visualization may include an indication of other dimensions of data to be visualized.

At 1055, the system generates the visualization. The visualization is generated based at least in part on the visualization definition. In some embodiments, the system translates the visualization definition to another high-level language, such as a language that is associated with a particular visualization type to be generated.

Figure 11:
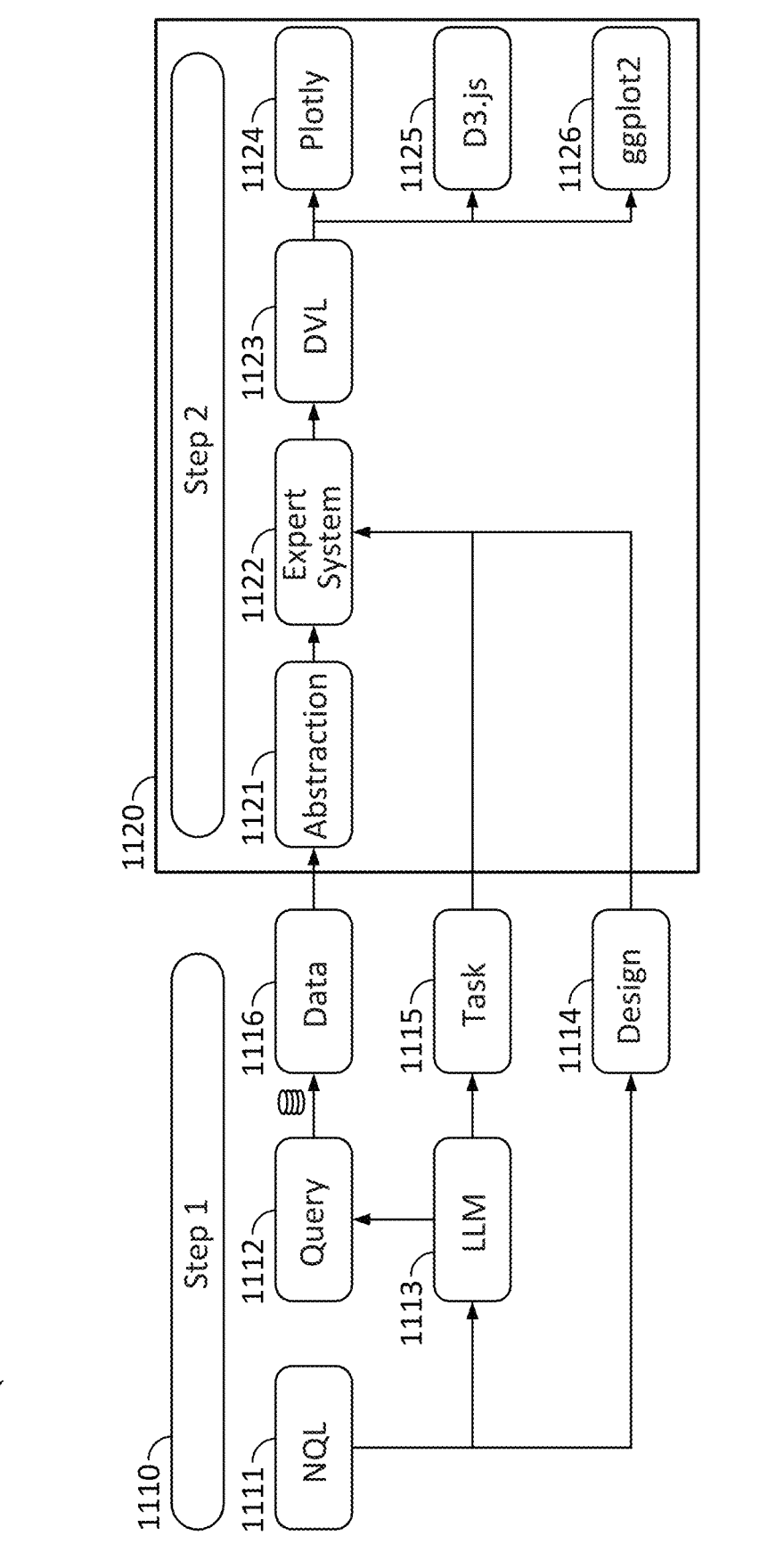
FIG. 11 illustrates a process for generating a visualization according to various embodiments.

FIG. 11 illustrates a process for generating a visualization according to various embodiments. Process 1100 is implemented by system 100 of FIG. 1, system 200 of FIG. 2, and/or system 300 of FIG. 3.

Process 1100 may comprise two main steps 1110 and 1120. Step 1110 may include receiving a natural language query and interpreting the natural language query to determine the criteria for the query, such as the query intent, task intent, and/or design intent. Step 1120 may include using the interpretation of the query (e.g., the query intent, task intent, and/or design intent) to determine a visualization type to be generated for the natural language query and to correspondingly generate the visualization.

In the example shown, step 1110 comprises steps 1111-1116 described below.

At 1111, a natural language query is received. 1111 may correspond to, or be similar to, 1005. At 1112, the natural language query is interpreted using a machine learning model (e.g., an LLM) to determine the query (e.g., the query criteria/query intent). 1112 may correspond to, or be similar to, 1010. At 1113, the query criteria (e.g., the query intent or other definition of the query) is determined based on an output from the machine learning model. At 1114, the data deemed to be responsive to the query is obtained. The system determines the one or more data sources to be queried to retrieve the result data based at least in part on the criteria. At 1115, the task criteria (e.g., the task intent) is determined. The task criteria may be determined based at least in part on the interpretation of the natural language query using the machine learning model (e.g., the LLM). 1115 may correspond to, or be similar to, 1020. At 1116, the design criteria (e.g., the design intent) is determined. The design criteria may be determined directly from the natural language query or based on the interpretation of the natural language query using the machine learning model (e.g., the LLM). 1116 may correspond to, or be similar to, 1025.

In some embodiments, 1114 and 1115 (e.g., determining the task criteria and design criteria) may be optionally implemented. As an example, the visualization may be generated based on the responsive data upon data abstraction. The system may generate the visualization definition based on the data abstraction, and thereafter generate the visualization.

In the example shown, step 1120 comprises steps 1121-1126 described below.

At 1121, the system abstracts the criteria/parameters for the natural language. In the example shown, at 1121 the system determines a data abstraction based on the result data obtained from the set of one or more data sources identified based on the query intent. In other implementations, 1121 may include using the task criteria and design criteria determined at 1115 and 1116, respectively, to determine a task abstraction and design abstraction. 1121 may correspond to, or be similar to, 1030, 1035, and/or 1040. At 1122, the system queries an expert system/service that analyzes the data abstraction and determines a visualization type to be generated for the result data. In some embodiments, the expert system or service comprises checking a set of rules against subsets of data in the result data, scoring the rule, and selecting a visualization type corresponding to a highest ranked/scored rule. For example, 1112 includes invoking process 1200 of FIG. 12. At 1123, in response to determining the visualization type to represent the result data, the system generates a visualization definition. The system may determine the visualization definition based at least in part on one or more of the query intent, the task intent, and/or the design intent. 1123 may correspond to, or be similar to, 1050. In some embodiments, the system generates the visualization based at least in part on the visualization definition. For example, the system selects an application or service to be invoked in connection with generating the visualization. In the example shown, the system selects whether to perform 1124 (e.g., generate the visualization using Plotly), 1125 (e.g., generate the visualization using D3.js), or 1126 (e.g., generate the visualization using ggplot2). Various other visualization applications or services may be implemented.

In some embodiments, 1115 and 1116 (e.g., determining the task criteria and design criteria) may be optionally implemented. As an example, the visualization may be generated based on the responsive data upon data abstraction. The system may generate the visualization definition based on the data abstraction, and thereafter generate the visualization.

FIG. 12 illustrates a process for determining a visualization type according to various embodiments. Process 1200 is implemented by system 100 of FIG. 1 and/or system 300 of FIG. 3. In some embodiments, process 1200 corresponds to an expert system or service that is used to select a visualization type based at least in part on the data abstraction. Steps 1225 and 1230 may be optionally performed. For example, steps 1205-1220 may be implemented to select the visualization type, and steps 1225 and 1230 may be performed to generate the visualization and receive user feedback.

At 1205, the system determines all possible ordered subsets of data. In the example shown, possible ordered subsets of data include the subsets: (i) A, (ii) B, (iii) C, (iv) AB, (v) BA, etc. The system obtains the result data retrieved from the appropriate data source(s) based on the query intent, and determines the possible ordered subsets within the result data.

At 1210, the system checks each rule against each subset of data in the ordered subset of data. The system stores a rulebook comprising a set of predefined rules. The rules may be configured to return the value "true" if the subset of data matches the rule (e.g., the visualization type can be implemented to display the subset of data), and return the value "false" if the subset of data does not match the rule. In some implementations, the rules return binary values (e.g., 0 and 1) rather than "true" and "false". In the example shown, the subset of data AB is checked against rules such as a bar rule (e.g., a rule corresponding to a bar chart visualization type), a line rule (e.g., a rule corresponding to a line chart visualization type), a donut rule (e.g., a rule corresponding to a donut visualization type), a map rule (e.g., a rule corresponding to a map visualization type), a sunburst rule (e.g., a rule corresponding to a sunburst visualization type), a parallel sets rule (e.g., a rule corresponding to a parallel sets visualization type), a pie chart rule (e.g., a rule corresponding to a pie chart visualization type), a histogram (e.g., a rule corresponding to a histogram visualization type), a single value (e.g., a rule corresponding to a single value type), a map (e.g., a rule corresponding to a map visualization type), a bubble map (e.g., a rule corresponding to a bubble map visualization type), a time bubble map (e.g., a rule corresponding to a time bubble map visualization type), a pie map (e.g., a rule corresponding to a pie map visualization type), a tree map (e.g., a rule corresponding to a tree visualization type), a sankey (e.g., a rule corresponding to a sankey visualization type), a polar bar chart (e.g., a rule corresponding to a polar bar chart visualization type), a scatter plot (e.g., a rule corresponding to a scatter plot visualization type), a table (e.g., a rule corresponding to a table visualization type). Various other types of visualizations and corresponding rules for the visualization types may be implemented.

At 1215, the system scores the rules against which the subsets of data are checked/matched. In some embodiments, the system generates a score vector for the rules (e.g., for each rule). The scoring vector for each rule is determined based on a scoring criteria for the use of a particular rule with respect to a particular ordered subset. Examples of the scoring criteria include a compatibility (e.g., a measure of the compatibility for the use of the visualization type for the rule with the result data), a coverage (e.g., a measure of the coverage for the use of the visualization type for the rule with the result data), a fanciness (e.g., a measure of the fanciness or appeal for using visualization type for the rule with the result data), a user preference (e.g., a measure of a user preference for using the visualization type for the rule with the result data), etc. Various other scoring criteria may be implemented. The user preferences may be determined/updated based on user feedback that is solicited in connection with providing a visualization for a particular natural language query (e.g., feedback that may indicate a degree of preference for using a particular visualization type for a data abstraction having certain properties).

At 1220, the system ranks the rules. In some embodiments, the system determines a ranking of the rules based on the scores or scoring vectors associated with each rule. For example, the system performs a pareto front optimization. The system selects a rule corresponding to a point along the pareto front.

In some embodiments, the visualization type is based at least in part on a rule having the highest ranking or score. For example, the system determines the visualization type associated with the selected rule corresponding to a point on the pareto front.

At 1225, the system generates a visualization(s) based on the selected rule(s). In some embodiments, the system provides a plurality of visualizations for a particular natural language query. For example, different visualizations that represent the result data in different manners are provided.

At 1230, the system obtains user feedback. The system may prompt the user to indicate feedback for the visualization of the result data according to the selected visualization type. The user feedback may be a binary selection of like/dislike, such as a thumbs-up or thumbs-down feedback. Alternatively, the user feedback may include a scoring of the visualization according to a predefined scale (e.g., the user selects a value between 0 and 10 for the user's preference for use of such visualization type for the result data). The system may iteratively/continuously update the user preference score in the score vector based at least in part on the user feedback.

Figure 13:
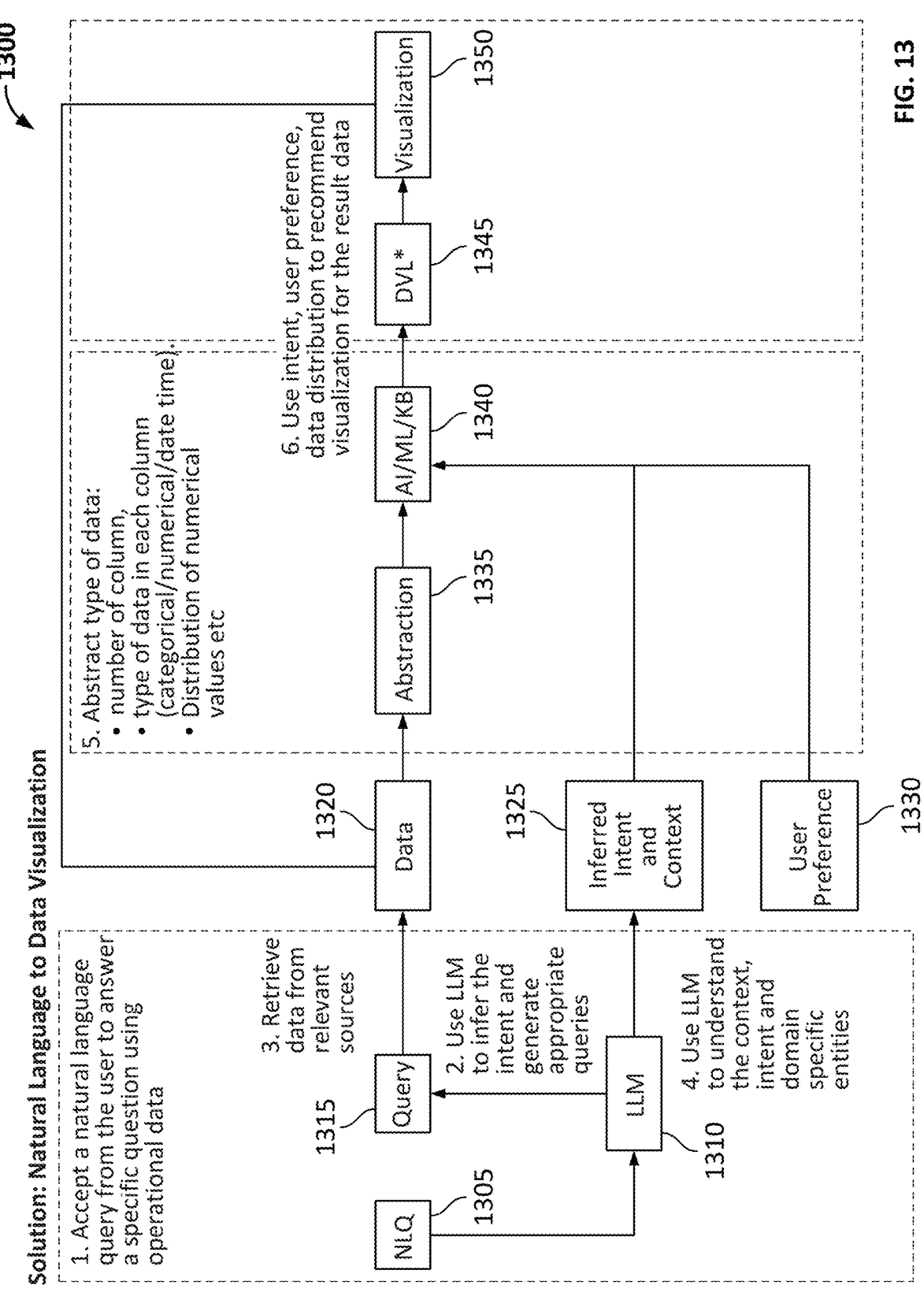
FIG. 13 illustrates a process for generating a visualization according to various embodiments.

FIG. 13 illustrates a process for generating a visualization according to various embodiments. Process 1300 is implemented by system 100 of FIG. 1 and/or system 400 of FIG. 4.

At 1305, a natural language query is received. In some embodiments, the system receives the natural language query based on user input to a user interface presented to a client system used by the user. The natural language query is directed to requesting an answer to a specific question using operational data.

At 1310, the natural language query is interpreted using a machine learning model. In some embodiments, the system queries an LLM based on the natural language query. The LLM may interpret the intent for the query. Examples of the intent for the query include a query intent (e.g., an indication of data that is responsive to the natural language query), a task intent, and/or a design or context intent.

At 1315, the system obtains the query intent based on the interpretation of the natural language query using the LLM. The system may determine one or more data requests (e.g., subqueries) for obtaining result data from one or more data sources. In some embodiments, the system determines the one or more data sources from which at least a subset of the result data is to be obtained. The system may determine the one or more data sources based at least in part on the query intent. The system generates the one or more data requests based on the one or more data sources identified based on the query intent.

At 1320, the system obtains the result data from the one or more data sources. For example, the system communicates the one or more data requests and receives the data from the one or more data sources.

At 1325, the system obtains an intent and context based on the interpretation of the natural language query using the LLM. The LLM may provide an inferred intent and context. As an example, the inferred intent and context includes a task intent and/or a design intent.

At 1330, the system determines a user preference for the user associated with the natural language query (e.g., the user that input the natural language query, or the user to whom a requested visualization is to be provided).

At 1335, the system abstracts the result data to obtain a data abstraction. In some embodiments, the obtaining the data abstraction includes determining one or more properties or statistics for the result data. Examples of the properties/statistics include (i) a number of columns, (ii) a type of data in each column (e.g., categorical, numerical, date/time, etc.), (iii) a distribution of numerical values, etc.

At 1340, the system queries a machine learning model to provide a prediction. The prediction may include a predicted visualization type or a predicted visualization definition. The machine learning model provides the prediction based at least in part on the data abstraction. In some embodiments, the system queries the machine learning model based on the data abstraction and the inferred intent and context (e.g., the task intent, the design intent, etc.) and/or a user preference.

The machine learning model may be an LLM. The machine learning model may be the same as, or different from the LLM used to interpret the natural language query. For example, the machine learning model providing the predicted visualization type or visualization definition may be a more lightweight model as compared to the LLM used to interpret the natural language query.

At 1345, the system obtains a visualization definition. In some embodiments, the visualization definition is in a predefined data visualization language.

The visualization definition is obtained based at least in part on the prediction from the machine learning model obtained at 1340. As an example, the visualization definition is a predicted visualization definition output from the machine learning model. As another example, the system obtains a predicted visualization type as an output from the machine learning model and generates the visualization definition according to a predefined data visualization language.

At 1350, the system obtains a visualization. The visualization is generated based at least in part on the visualization definition obtained at 1345. For example, the system queries another application or service to generate the visualization based at least in part on the visualization definition. As another example, the system generates the visualization based at least in part on the visualization definition. The system may translate the visualization definition from the predefined data visualization language to another language such as a language that is determined based on a visualization type for the visualization to be generated.

Figure 14:
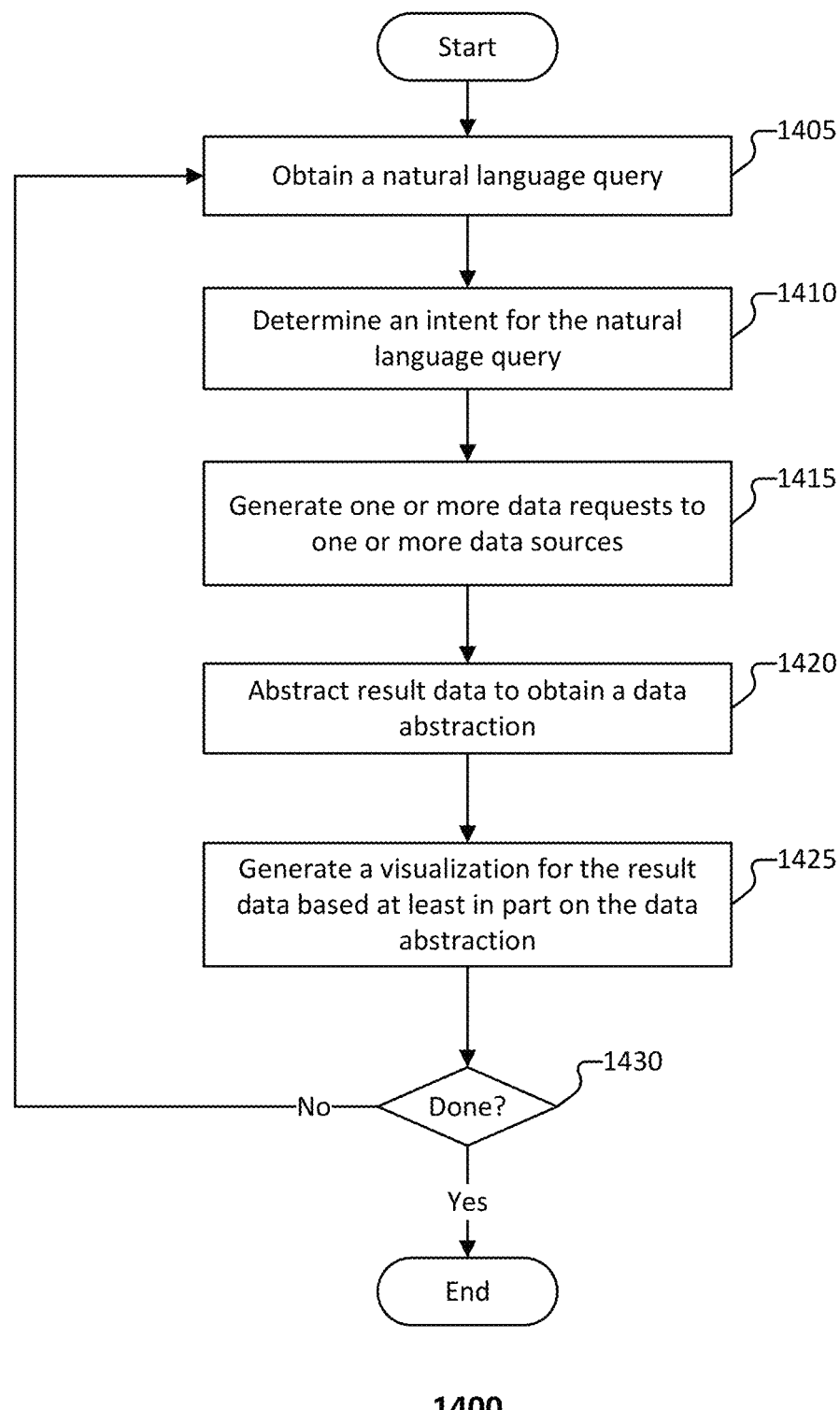
FIG. 14 is a flow diagram of a method for generating a visualization based on a natural language query according to various embodiments.

FIG. 14 is a flow diagram of a method for generating a visualization based on a natural language query according to various embodiments. Process 1400 is implemented by system 100 of FIG. 1, system 200 of FIG. 2, system 300 of FIG. 3, and/or system 400 of FIG. 4.

At 1405, a natural language query is obtained. At 1410, an intent for the natural language query is determined. The intent may be a query intent that includes one or more of a data intent, a task intent, and/or a design intent. The intent for the natural language query is determined based at least in part on using a machine learning model (e.g., a large language model such as ChatGPT, etc.) to analyze the natural language query. At 1415, one or more data requests to the one or more data sources are generated. The system identifies the data source(s) to query based on the intent and correspondingly generates requests to query those identified data source(s). At 1420, result data is abstracted to obtain a data abstraction. At 1425, a visualization for the result data is generated based at least in part on the data abstraction. In some embodiments, the system generates a visualization definition (e.g., in a data visualization language) based on the data abstraction. The system uses the visualization definition to generate the visualization. The system may directly generate the visualization based on the visualization definition, or the system may first translate the visualization definition from the data visualization language to another language (e.g., a high-level language that may be selected based on a type of visualization to be generated), and use the translated visualization definition to generate the image. At 1430, a determination is made as to whether process 1400 is complete. In some embodiments, process 1400 is determined to be complete in response to a determination that no further visualizations are to be generated, no further queries are received for data visualizations, an administrator indicates that process 1400 is to be paused or stopped, etc. In response to a determination that process 1400 is complete, process 1400 ends. In response to a determination that process 1400 is not complete, process 1400 returns to 1405.

Figure 15:
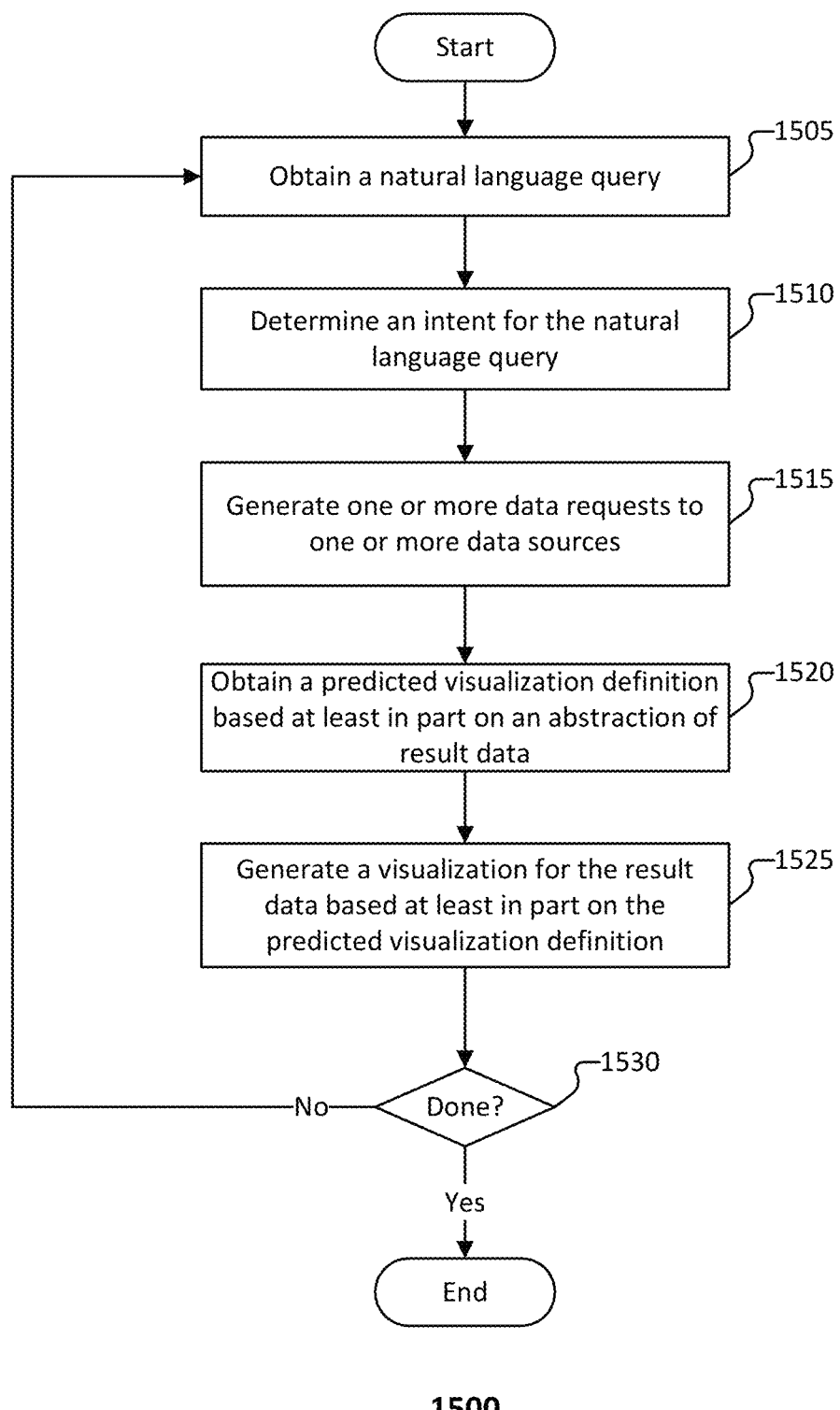
FIG. 15 is a flow diagram of a method for generating a visualization based on a natural language query according to various embodiments.

FIG. 15 is a flow diagram of a method for generating a visualization based on a natural language query according to various embodiments. Process 1500 is implemented by system 100 of FIG. 1, system 200 of FIG. 2, system 300 of FIG. 3, and/or system 400 of FIG. 4.

At 1505, a natural language query is obtained. At 1510, an intent for the natural language query is determined. 1510 may be similar to, or the same as, 1410 of process 1400 of FIG. 14. At 1515, one or more data requests to the one or more data sources are generated. 1515 may be similar to, or the same as, 1415 of process 1400 of FIG. 14. At 1520, a predicted visualization definition is obtained based at least in part on the abstraction of result data. For example, the system first obtains a data abstraction for the result data, and then determines the predicted visualization definition based on the data abstraction. In some embodiments, determining the predicted visualization definition includes querying a prediction engine (e.g., a machine learning model) to predict a visualization definition of the visualization to be generated. At 1525, a visualization for the result data is generated based at least in part on the predicted visualization definition. At 1530, a determination is made as to whether process 1500 is complete. In some embodiments, process 1500 is determined to be complete in response to a determination that no further visualizations are to be generated, no further queries are received for data visualizations, an administrator indicates that process 1500 is to be paused or stopped, etc. In response to a determination that process 1500 is complete, process 1500 ends. In response to a determination that process 1500 is not complete, process 1500 returns to 1505.

Figure 16:
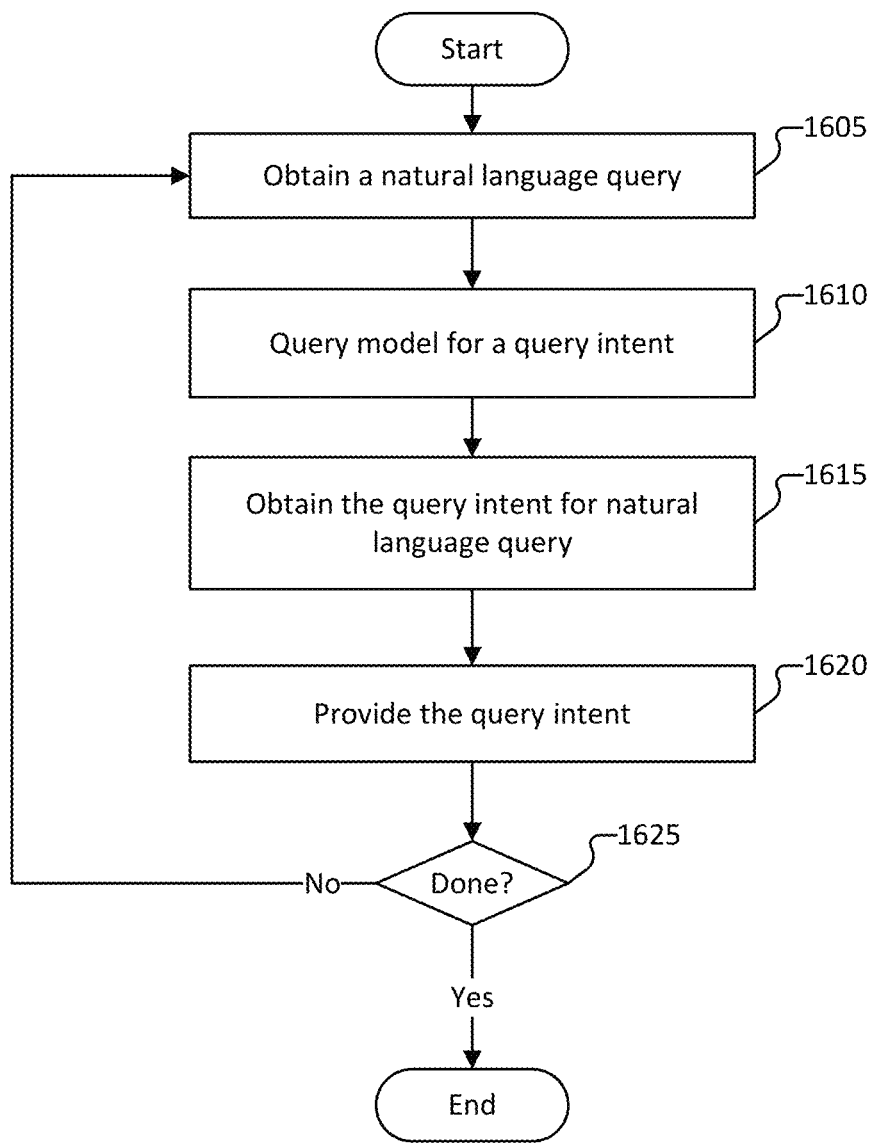
FIG. 16 is a flow diagram of a method for determining a query intent for a natural language query according to various embodiments.

FIG. 16 is a flow diagram of a method for determining a query intent for a natural language query according to various embodiments. Process 1600 is implemented by system 100 of FIG. 1, system 200 of FIG. 2, system 300 of FIG. 3, and/or system 400 of FIG. 4. In some embodiments, process 1600 is invoked by process 1400 (e.g., at 1410), or by process 1500 (e.g., at 1510).

At 1605, a natural language query is obtained. In some embodiments, the natural language query corresponds to a query input by a user to a user interface. At 1610, a model is queried for the query intent. The system queries the model based at least in part on the natural language query. For example, the system requests a machine learning model, such as a large language model, to interpret the natural language query. At 1615, the query intent for the natural language query is obtained (e.g., from the model or the service providing the model that is queried). At 1620, the query intent is provided. For example, the system provides the query intent to the system or service that invoked process 1600. At 1625, a determination is made as to whether process 1600 is complete. In some embodiments, process 1600 is determined to be complete in response to a determination that no further visualizations are to be generated, no further queries are received for data visualizations, no further queries are to be analyzed, an administrator indicates that process 1600 is to be paused or stopped, etc. In response to a determination that process 1600 is complete, process 1600 ends. In response to a determination that process 1600 is not complete, process 1600 returns to 1605.

Figure 17:
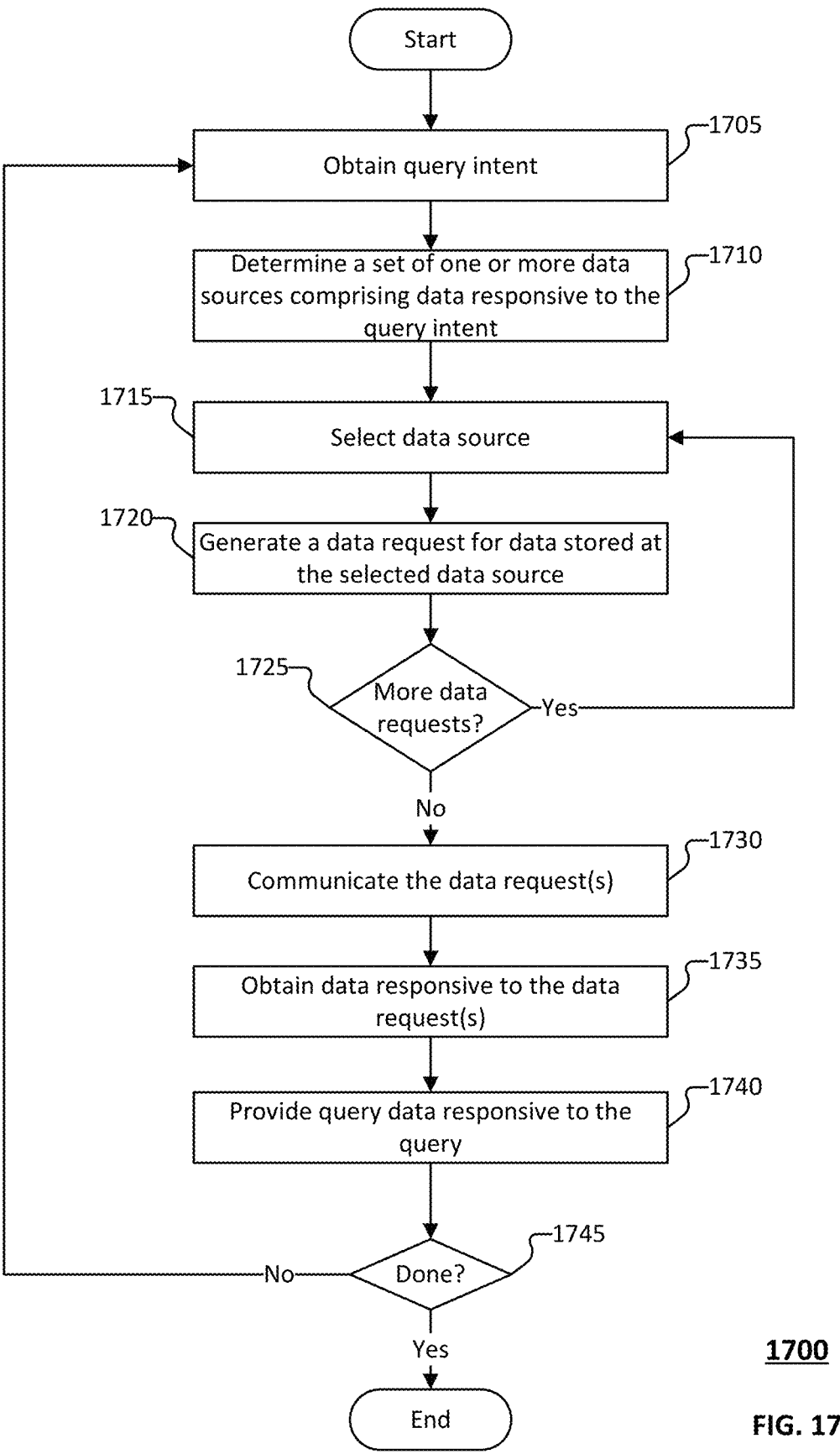
FIG. 17 is a flow diagram of a method for obtaining data responsive to a query based on a query intent according to various embodiments.

FIG. 17 is a flow diagram of a method for obtaining data responsive to a query based on a query intent according to various embodiments. Process 1700 is implemented by system 100 of FIG. 1, system 200 of FIG. 2, system 300 of FIG. 3, and/or system 400 of FIG. 4. In some embodiments, process 1700 is invoked by process 1400 (e.g., at 1415), or by process 1500 (e.g., at 1515).

At 1705, a query intent is obtained. The query intent may be received in connection with the request invoking process 1700 to be performed. For example, a system may use process 1600 to determine the query intent, and thereafter invoke process 1700 based on the determined query intent. At 1710, a set of one or more data sources comprising data responsive to the query intent is determined. At 1715, a data source is selected. The data source is selected from the set of one or more data sources determined to comprise data responsive to the query intent. At 1720, the system generates a data request for data stored at the selected data source. For example, the system generates the data request based at least in part on the data stored and the query intent. In the case of the selected data source storing a subset of the data responsive to the query intent, the system determines the subset of data stored at the selected data source and generates a corresponding data request to obtain the data. At 1725, the system determines whether another data request is to be generated. For example, the system determines whether the set of data sources determined at 1710 comprises another data source for which a request is to be generated to obtain data responsive to the query intent. In response to determining that another data request is to be generated (e.g., for a different data source), process 1700 returns to 1715 and iterates over 1715-1725 until the system determines that no further data requests are to be generated. In response to determining that another data request is not to be generated, process 1700 proceeds to 1730. At 1730, the data request(s) is communicated. For example, the system communicates the data requests to their respective corresponding data sources (e.g., the data sources within the set of one or more data sources from which the at least the subset of responsive data is to be obtained). At 1735, data responsive to the data request(s) is obtained. For example, the system obtains the respective data responsive to each of the data requests generated to query the data source(s) to perform the query intent. At 1740, the query data responsive to the query is provided. For example, the system provides the query data to the system or service that invoked process 1700. At 1745, a determination is made as to whether process 1700 is complete. In some embodiments, process 1700 is determined to be complete in response to a determination that no further visualizations are to be generated, no further data is to be retrieved, no further queries are received for data visualizations, an administrator indicates that process 1700 is to be paused or stopped, etc. In response to a determination that process 1700 is complete, process 1700 ends. In response to a determination that process 1700 is not complete, process 1700 returns to 1705.

Figure 18:
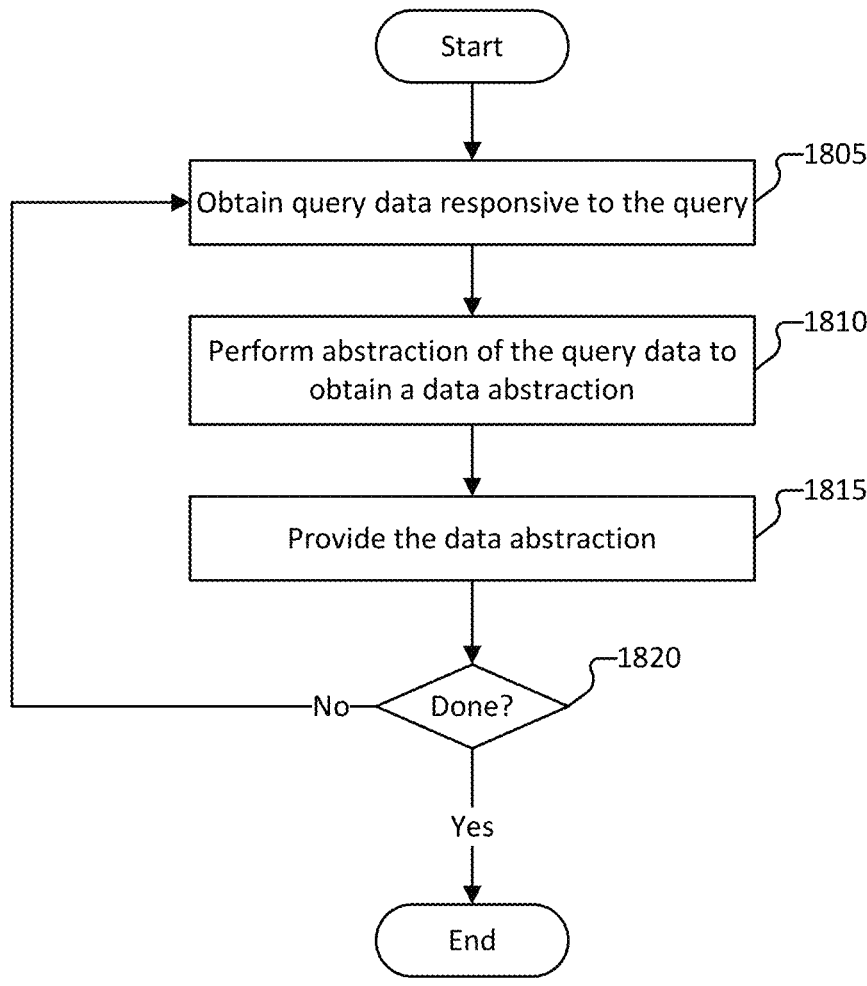
FIG. 18 is a flow diagram of a method for obtaining data responsive to a query based on a query intent according to various embodiments.

FIG. 18 is a flow diagram of a method for obtaining data responsive to a query based on a query intent according to various embodiments. Process 1800 is implemented by system 100 of FIG. 1, system 200 of FIG. 2, system 300 of FIG. 3, and/or system 400 of FIG. 4. In some embodiments, process 1800 is invoked by process 1400 (e.g., at 1420), or by process 1500 (e.g., in connection with performing 1520).

At 1805, query data responsive to the query is obtained. The query data responsive to the query may be received in connection with the request invoking process 1800 to be performed. For example, a system may use process 1700 to determine the query data, and thereafter invoke process 1800 based on the determined query data. At 1810, an abstraction of the query data is performed to obtain a data abstraction. In some embodiments, obtaining the data abstraction includes determining one or more statistical properties pertaining to the result data. The determining the one or more statistical properties pertaining to the result data comprises analyzing the result data, including applying one or more predefined rules to obtain the one or more statistical properties. As an example, the one or more statistical properties comprise one or more of columns, data in the columns, outlier data, and a distribution of numeric values. At 1815, the data abstraction is provided. For example, the system provides the data abstraction to the system or service that invoked process 1800. At 1820, a determination is made as to whether process 1800 is complete. In some embodiments, process 1800 is determined to be complete in response to a determination that no further visualizations are to be generated, no further data is to be abstracted, no further queries are received for data visualizations, an administrator indicates that process 1800 is to be paused or stopped, etc. In response to a determination that process 1800 is complete, process 1800 ends. In response to a determination that process 1800 is not complete, process 1800 returns to 1805.

Figure 19:
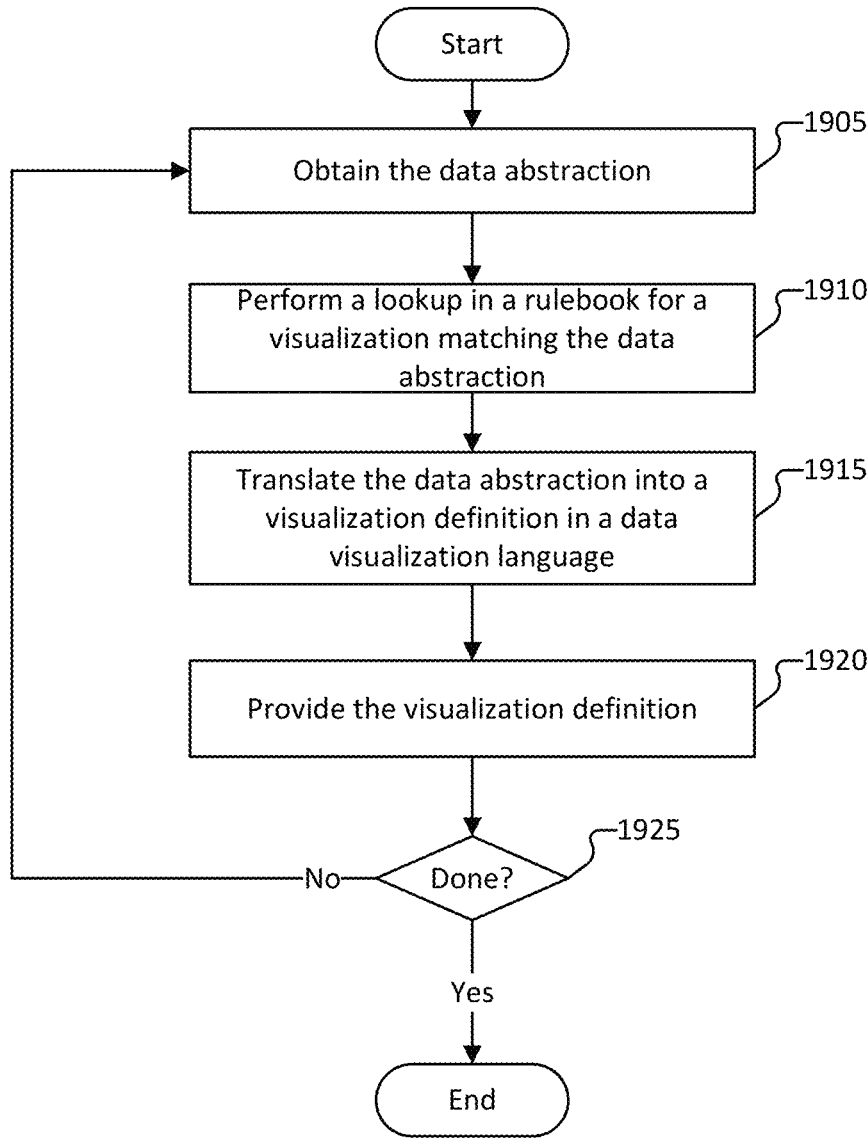
FIG. 19 is a flow diagram of a method for determining a visualization definition for a data abstraction according to various embodiments.

FIG. 19 is a flow diagram of a method for determining a visualization definition for a data abstraction according to various embodiments. Process 1900 is implemented by system 100 of FIG. 1 and/or system 200 of FIG. 2. In some embodiments, process 1900 is invoked by process 1400 (e.g., at 1425 in connection with generating the visualization).

At 1905, a data abstraction is obtained. The data abstraction may be received in connection with the request invoking process 1900 to be performed. For example, a system may use process 1800 to determine the data abstraction, and thereafter invoke process 1900 based on the determined query data. At 1910, a lookup is performed in a rulebook for a visualization matching the data abstraction. The rulebook may comprise a set of predefined rules that are indicative of a type of visualization to be generated based on the data abstraction (e.g., based on the properties/statistics for the data responsive to the query). The rulebook may comprise a hierarchy of the set of predefined rules. The system may use the hierarchy to form a decision tree to walk through the rulebook to determine the visualization (e.g., a type of visualization to be generated). The system determines the type of visualization or rule indicative of the type of visualization to be generated for the query or data abstraction for the query. At 1915, the data abstraction is translated into a visualization definition in a data visualization language. The system determines the visualization definition for the visualization of data responsive to the query is based at least in part on the rule in the rulebook (or type of visualization) to which the data abstraction matches. At 1920, the visualization definition is provided. For example, the system provides the visualization definition to the system or service that invoked process 1900. At 1925, a determination is made as to whether process 1900 is complete. In some embodiments, process 1900 is determined to be complete in response to a determination that no further visualization definitions are to be determined, no further queries are received for data visualizations, an administrator indicates that process 1900 is to be paused or stopped, etc. In response to a determination that process 1900 is complete, process 1900 ends. In response to a determination that process 1900 is not complete, process 1900 returns to 1905.

Figure 20:
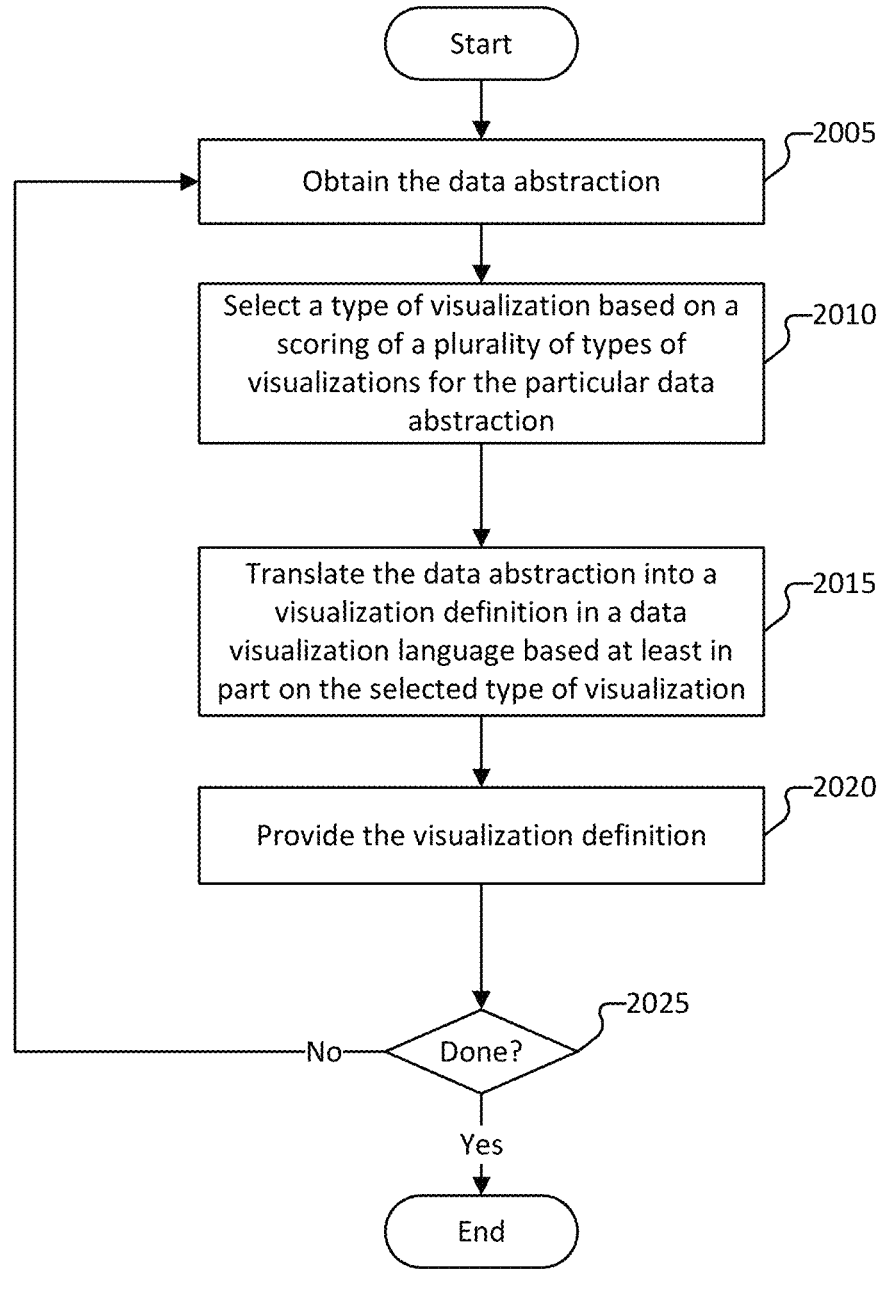
FIG. 20 is a flow diagram of a method for determining a visualization definition for a data abstraction according to various embodiments.

FIG. 20 is a flow diagram of a method for determining a visualization definition for a data abstraction according to various embodiments. Process 2000 is implemented by system 100 of FIG. 1 and/or system 300 of FIG. 3. In some embodiments, process 2000 is invoked by process 1400 (e.g., at 1425 in connection with generating the visualization).

At 2005, the data abstraction is obtained. The data abstraction may be received in connection with the request invoking process 2000 to be performed. For example, a system may use process 1800 to determine the data abstraction, and thereafter invoke process 2000 based on the determined query data. At 2010, a type of visualization is selected based on a scoring of a plurality of types of visualization for the particular data abstraction. In some embodiments, the type of visualization is selected based at least in part on performing process 1200 (e.g., performing at least steps 1205-1220 of process 1200) or by invoking process 2100. At 2015, the data abstraction is translated into a visualization definition in a data visualization language based at least in part on the selected type of visualization. At 2020, the visualization definition is provided. For example, the system provides the visualization definition to the system or service that invoked process 2000. At 2025, a determination is made as to whether process 2000 is complete. In some embodiments, process 2000 is determined to be complete in response to a determination that no further visualization definitions are to be determined, no further queries are received for data visualizations, an administrator indicates that process 2000 is to be paused or stopped, etc. In response to a determination that process 2000 is complete, process 2000 ends. In response to a determination that process 2000 is not complete, process 2000 returns to 2005.

Figure 21:
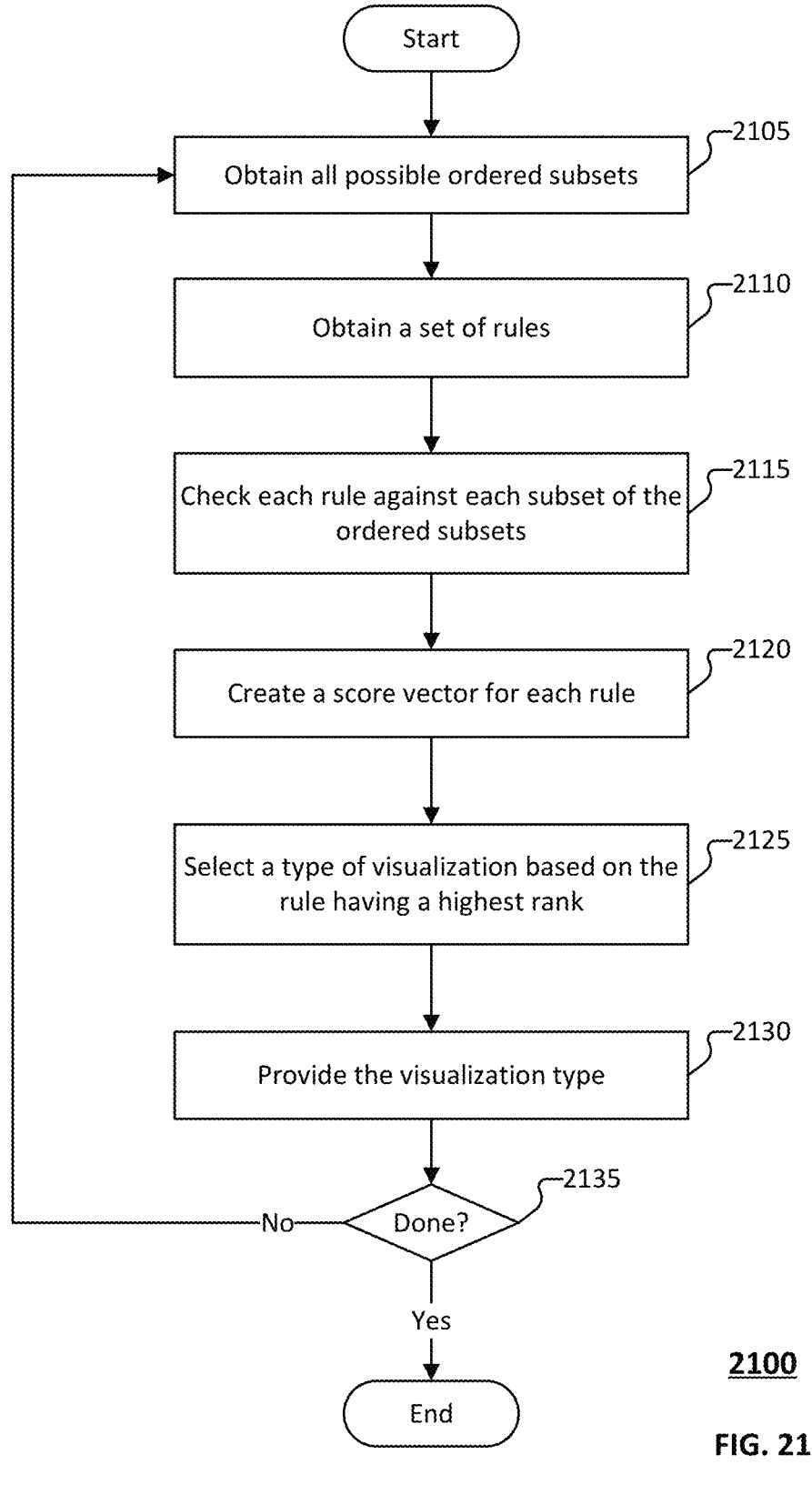
FIG. 21 is a flow diagram of a method for determining a visualization type for a data abstraction according to various embodiments.

FIG. 21 is a flow diagram of a method for determining a visualization type for a data abstraction according to various embodiments. Process 2100 is implemented by system 100 of FIG. 1 and/or system 300 of FIG. 3. In some embodiments, process 2100 is invoked by process 2000 (e.g., at 2010).

At 2105, all possible ordered subsets are obtained. The system obtains the data responsive to the query (e.g., data retrieved from one or more data sources) and determines the different possible subsets of data. At 2110, a set of rules is obtained. The system determines the set of rules within a predefined rulebook. The rulebook comprises rules that are used in determining a type of visualization to be generated for a particular natural language query. At 2115, each rule (e.g., rule in the rulebook) is checked against each subset of the ordered subsets. For example, the checking a particular rule against an ordered subset includes analyzing the ordered subset to determine a result of the rule, such as determining whether the rule is true or false (e.g., whether the ordered subset satisfies the rule). At 2120, a score vector is created for each rule. The score vector may be based on one or more scoring criteria. Examples of scoring criteria include a compatibility, a coverage, a fanciness, a user preference, etc. Various other types of scoring criteria may be implemented. At 2125 a type of visualization is selected based on a rule having a highest rank. The system may determine the ranking of the set of rules based on the scoring criteria. For example, the rule having a highest aggregate score for the set of scoring criteria may be selected. In connection with determining the rule having a highest rank, the system may perform a pareto front optimization algorithm. At 2130, the visualization type is provided. For example, the system provides the type of visualization to the system or service that invoked process 2100 (e.g., to process 2000). At 2135, a determination is made as to whether process 2100 is complete. In some embodiments, process 2100 is determined to be complete in response to a determination that no further visualization definitions are to be determined, no further visualization types are to be determined, no further queries are received for data visualizations, an administrator indicates that process 2100 is to be paused or stopped, etc. In response to a determination that process 2100 is complete, process 2100 ends. In response to a determination that process 2100 is not complete, process 2100 returns to 2105.

Figure 22:
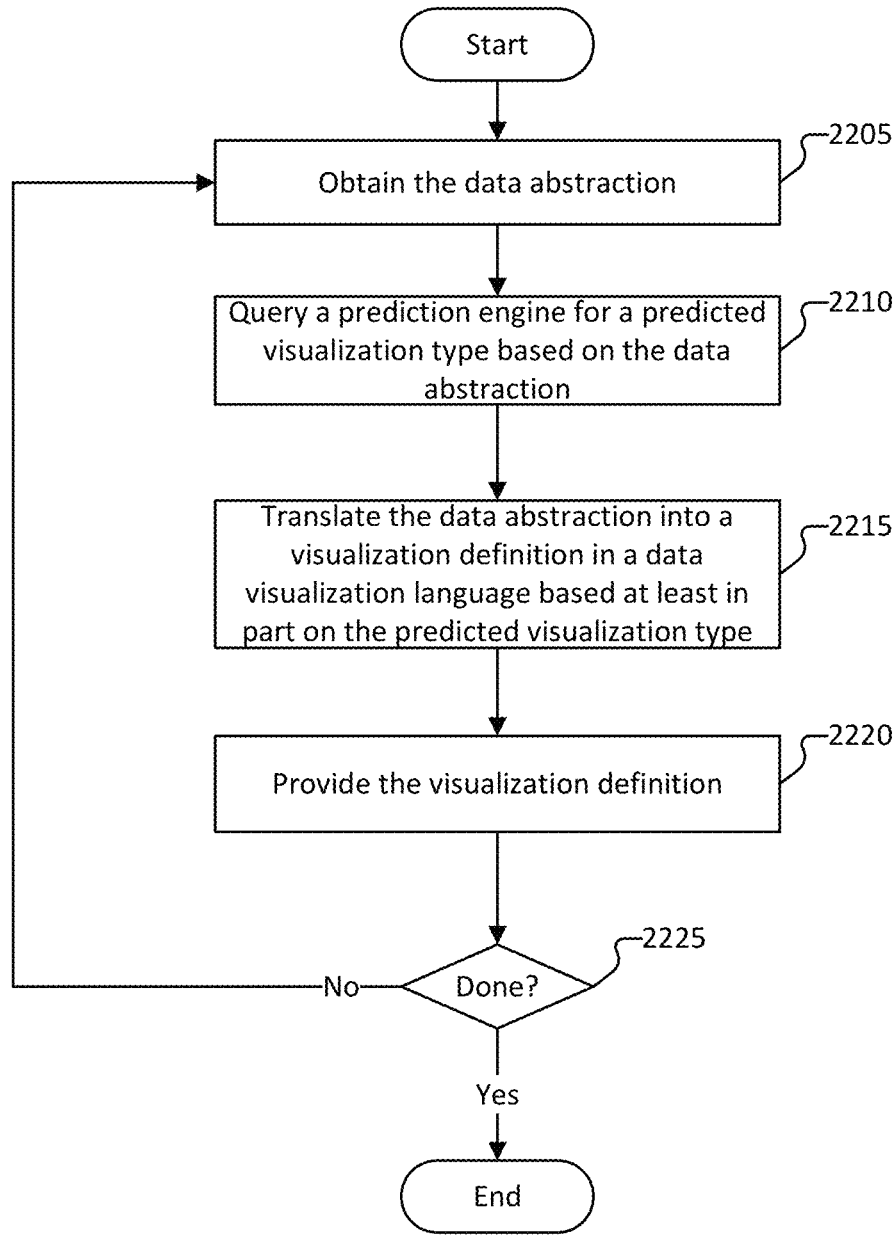
FIG. 22 is a flow diagram of a method for determining a visualization definition for a data abstraction according to various embodiments.

FIG. 22 is a flow diagram of a method for determining a visualization definition for a data abstraction according to various embodiments. Process 2200 is implemented by system 100 of FIG. 1 and/or system 400 of FIG. 4. In some embodiments, process 2200 is invoked by process 1500 (e.g., at 1520).

At 2205, a data abstraction is obtained. The obtaining the data abstraction may include determining one or more properties/statistics associated with query data (e.g., data responsive to the query). The data abstraction may be received in connection with the request invoking process 2200 to be performed. At 2210, a prediction engine for a predicted visualization type is queried based at least in part on the data abstraction. At 2215, the data abstraction is translated into a visualization definition in a data visualization language (e.g., a predefined data visualization language) based at least in part on the predicted visualization type. At 2220, the visualization definition is provided. For example, the system provides the type of visualization to the system or service that invoked process 2200 (e.g., process 1500). At 2225, a determination is made as to whether process 2200 is complete. In some embodiments, process 2200 is determined to be complete in response to a determination that no further visualization definitions are to be determined, no further queries are received for data visualizations, an administrator indicates that process 2200 is to be paused or stopped, etc. In response to a determination that process 2200 is complete, process 2200 ends. In response to a determination that process 2200 is not complete, process 2200 returns to 2205.

Although process 2200 describes the querying of a prediction engine (e.g., a machine learning model) for a predicted visualization type, various embodiments may implement a querying of a prediction engine for a predicted visualization definition. For example, the model may predict a particular predicted visualization for a particular query based on the data abstraction. The model may predict a visualization type and predict a particular visualization definition for visualizing the data responsive to the query according to the predicted visualization type.

Figure 23:
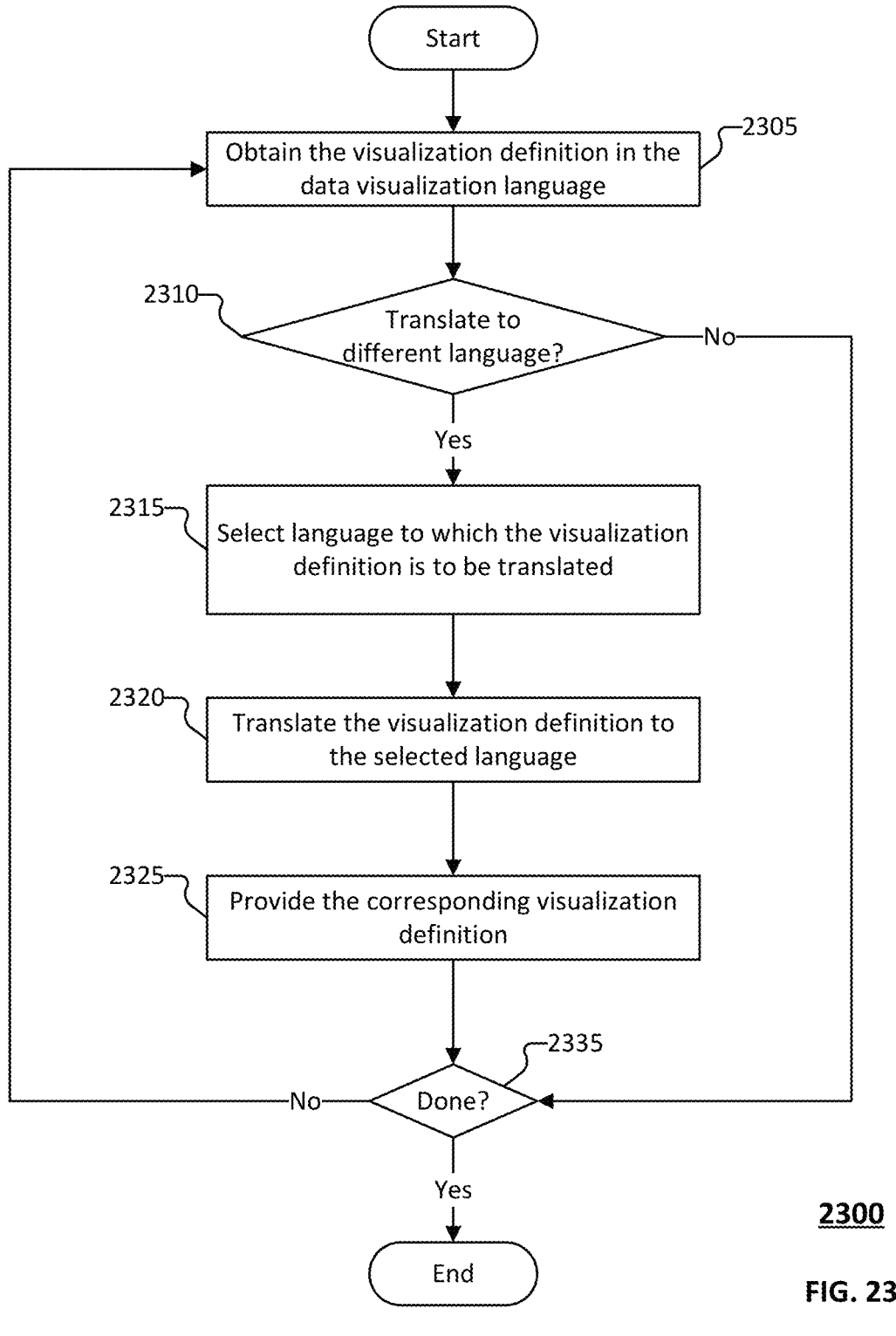
FIG. 23 is a flow diagram of a method for translating a visualization definition to another language according to various embodiments.

FIG. 23 is a flow diagram of a method for translating a visualization definition to another language according to various embodiments. Process 2300 is implemented by system 100 of FIG. 1, system 200 of FIG. 2, system 300 of FIG. 3, and/or system 400 of FIG. 4. In some embodiments, process 2300 is invoked by process 1400 (e.g., 1425) and/or process 1500 (e.g., at 1525).

At 2305, the visualization definition is obtained. The visualization definition is specified in a data visualization language. The visualization definition may be received in connection with the request invoking process 2400 to be performed. For example, the visualization definition may be defined/generated at process 1900 (e.g., at 1920), process 2000 (e.g., at 2020), and/or process 2100 (e.g., at 2130). At 2310, the system determines whether to translate the visualization definition to a different language. For example, the system determines whether another high-level language is to be used to generate a visualization, and in response to determining that another high-level language is to be used, the system determines to translate the visualization definition. In response to determining to translate the visualization definition at 2310, process 2300 proceeds to 2315. Conversely, in response to determining that the visualization definition is not to be translated at 2310, process 2300 proceeds to 2335. At 2315, a language to which the visualization definition is to be translated is selected (e.g., determined). The language to which the visualization definition is to be translated may be determined based at least in part on a type of visualization (e.g., certain types of visualizations may require a particular language). Examples of languages that may be used in connection with generating various types of visualizations include D3, R, python, etc. At 2320, the visualization definition is translated to the selected language. At 2325, the corresponding visualization definition is provided. At 2335, a determination is made as to whether process 2300 is complete. In some embodiments, process 2300 is determined to be complete in response to a determination that no further visualization definitions are to be determined, an administrator indicates that process 2300 is to be paused or stopped, etc. In response to a determination that process 2300 is complete, process 2300 ends. In response to a determination that process 2300 is not complete, process 2300 returns to 2305.

In some embodiments, a machine learning model (e.g., a large language model) for interpreting an intent of a natural language query and a machine learning model for predicting a visualization definition are different. As an example, the machine learning model for predicting a visualization definition may be smaller/more lightweight than the model used for predicting a query intent.

Figure 24:
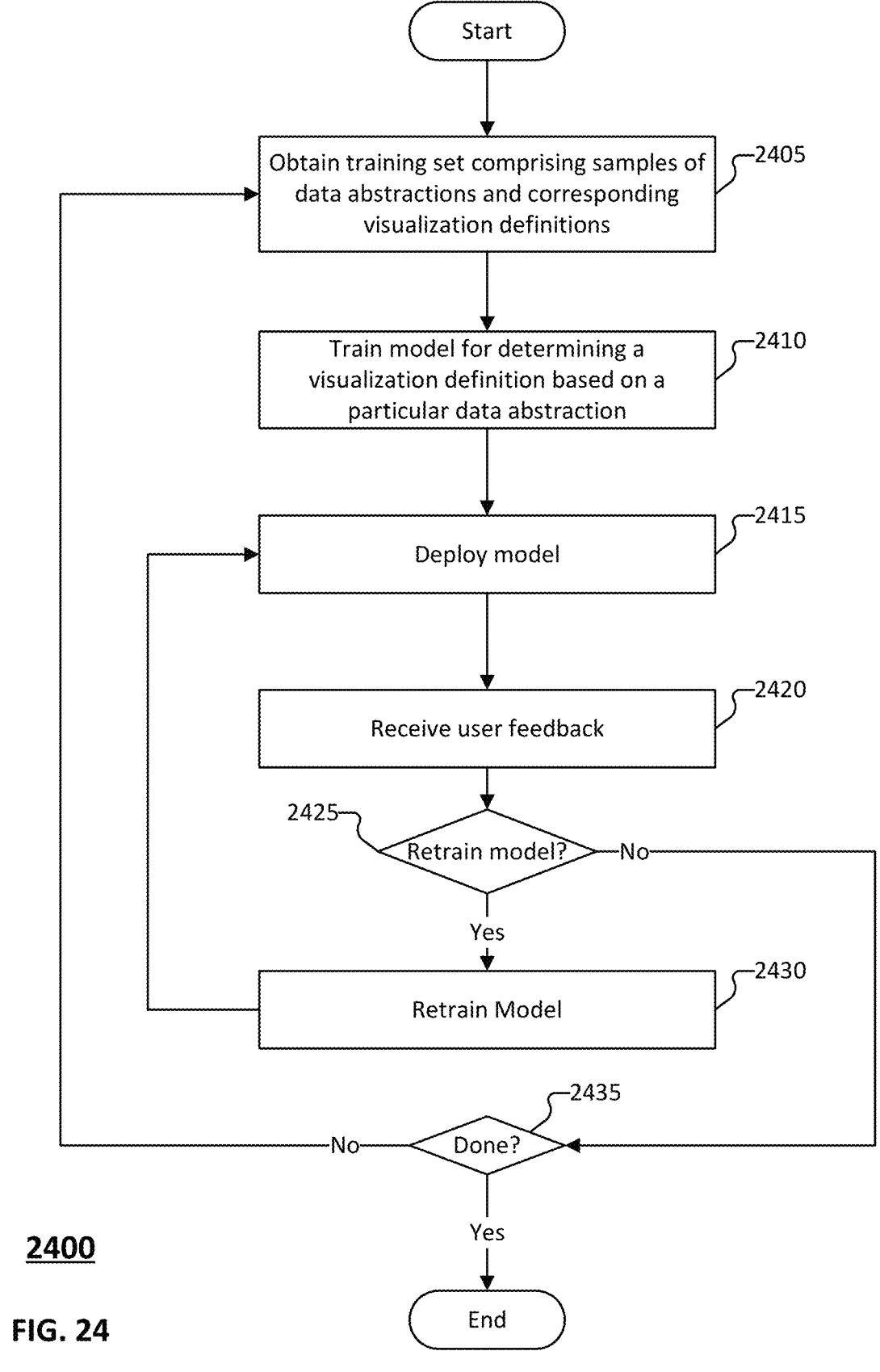
FIG. 24 is a flow diagram of a method for training a model according to various embodiments.

FIG. 24 is a flow diagram of a method for training a model according to various embodiments. Process 2400 is implemented by system 100 of FIG. 1, system 200 of FIG. 2, system 300 of FIG. 3, and/or system 400 of FIG. 4. Process 2400 may be implemented in connection with generating a model for predicting a visualization definition. A similar process may be implemented to train a model for predicting a query intent.

At 2405, a training set comprising samples of data abstractions and corresponding visualization definitions is obtained. At 2410, a model for determining a visualization definition based on a particular data abstraction is trained. The model may be configured to predict a visualization definition. In some embodiments, the model is a machine learning model that is trained according to a machine learning process. For example, the model is a large language model that interprets visualization definitions within the training set. At 2415, the model is deployed. At 2420, user feedback is received. The system may provide user feedback in response to a visualization being provided in response to a natural language query. The user feedback may include information indicative of an alternative visualization type requested/wanted by the user. In some embodiments, process 2400 proceeds to 2425 after a threshold number of user feedback records is received. At 2425, the system determines whether to retrain the model. The system may determine to retrain the model based on the user feedback. For example, the system may determine to retrain the model after a predefined number of user feedback records for corresponding visualizations is received. In response to determining to retrain the model, process proceeds to 2430 at which the model is retrained. Thereafter, process 2400 returns to 2415 and process 2400 iterates over 2415-2430 until the model is determined to not be retrained. Conversely, in response to determining that the model is not to be retrained, process 2400 proceeds to 2435. At 2435, a determination is made as to whether process 2400 is complete. In some embodiments, process 2400 is determined to be complete in response to a determination that no further models are to be determined/trained (e.g., no further classification models are to be created), an administrator indicates that process 2400 is to be paused or stopped, etc. In response to a determination that process 2400 is complete, process 2400 ends. In response to a determination that process 2400 is not complete, process 2400 returns to 2405.

Various examples of embodiments described herein are described in connection with flow diagrams. Although the examples may include certain steps performed in a particular order, according to various embodiments, various steps may be performed in various orders and/or various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for visualizing data, comprising:
one or more processors configured to:
obtain a natural language query;
determine an intent for the natural language query;
obtain query result data for the query based at least in part on the intent;
abstract the result data to obtain a data abstraction;
generate a visualization for the result data based at least in part on the data abstraction;
receive user feedback on regarding a representation of the result data with the visualization; and
updating one or more rules for determining visualization types to be used to represent data based at least in part on corresponding data abstractions and the user feedback; and
a memory coupled to the one or more processors and configured to provide the one or more processors with instructions.

2. The system of claim 1, wherein determining the intent for the natural language query includes querying a large language model based on the natural language query.

3. The system of claim 1, wherein the intent is determined based at least in part on a machine learning model.

4. The system of claim 1, wherein the one or more processors are further configured to:
determine one or more selected sources to query for the result data based at least in part on the intent.

5. The system of claim 1, wherein the result data is obtained from one or more data sources.

6. The system of claim 1, wherein abstracting the result data to obtain the data abstraction includes determining one or more statistical properties pertaining to the result data.

7. The system of claim 6, wherein the one or more statistical properties comprise one or more of columns, data in the columns, outlier data, and a distribution of numeric values.

8. The system of claim 6, wherein determining the one or more statistical properties pertaining to the result data comprises:
analyzing the result data, including applying one or more predefined rules to obtain the one or more statistical properties.

9. The system of claim 6, wherein the data abstraction is determined based at least in part on the one or more statistical properties.

10. The system of claim 1, wherein generating the visualization for the result data based at least in part on the data abstraction comprises determining a type of visualization based at least in part on the data abstraction, and creating the visualization based at least in part on the type of visualization.

11. The system of claim 1, wherein the data abstraction corresponds to a representation of the natural language query in accordance with a predefined data visualization language.

12. The system of claim 11, wherein the representation in accordance with the predefined data visualization language comprises an indication of a first dimension of the data to be visualized, a second dimension of the data to be visualized, and a type of visualization.

13. The system of claim 1, wherein the data abstraction indicates a type of visualization to be generated.

14. The system of claim 13, wherein the type of visualization is selected from a set of predefined visualizations, and the set of predefined visualizations include one or more of a bar chart, a line chart, a donut visualization, a map visualization, a bubble chart, a sunburst representation, a pie chart, a histogram, a single value, a map, a bubble map, a time bubble map, a pie map, a tree map, a sankey, a polar bar chart, a scatter plot, a table, and a parallel sets representation.

15. The system of claim 1, wherein abstracting the result data to obtain the data abstraction comprises:
    determining all possible ordered subsets of data for the result data;
    for each rule in a set of predefined rules, analyzing each subset of data with the particular rule to obtain a corresponding rule check;
    for each rule in the set of predefined rules, creating a score vector comprising the corresponding rule checks for the subsets of data;
    ranking the rules in the set of predefined rules based on the corresponding score vectors; and
    selecting the data abstraction based on the ranking of the rules.

16. The system of claim 15, wherein each rule in the set of predefined rules corresponds to a particular type of visualization.

17. The system of claim 15, wherein creating the score vector includes scoring a fit of a type of visualization for a particular rule to the subsets of data, the fit being scored according to a predefined scoring criteria.

18. The system of claim 17, wherein the scoring criteria includes scores for one or more of compatibility, coverage, fanciness, and user preference.

19. The system of claim 18, wherein the user preference is determined based at least in part on user feedback provided in response to one or more previous visualizations.

20. The system of claim 1, wherein abstracting the result data to obtain the data abstraction comprises:
    determining all possible ordered subsets of data for the result data;
    for each rule in a set of predefined rules, analyzing each subset of data with the particular rule to obtain a corresponding rule check;
    for each rule in the set of predefined rules, creating a score vector comprising the corresponding rule checks for the subsets of data;
    ranking the rules in the set of predefined rules based on the corresponding score vectors; and
    selecting the data abstraction based on the ranking of the rules.

21. The system of claim 1, wherein updating the one or more rules for determining visualization types comprises:
    updating a user preference score in a score vector associated with a visualization type based on the user feedback; and
    applying a pareto-front optimization to rank visualization types for future queries based on the updated score vector,
    wherein the score vector includes criteria comprising compatibility, coverage, fanciness, and user preference.

22. The system of claim 1, wherein the data abstraction corresponds to a representation of the natural language query in accordance with a predefined data visualization language, the representation comprising an indication of a first dimension of the data to be visualized, a second dimension of the data to be visualized, and a type of visualization.

23. A method for visualizing data, comprising:
    obtaining, by one or more processors, a natural language query;
    determining an intent for the natural language query;
    obtaining query result data for the query based at least in part on the intent;
    abstracting the result data to obtain a data abstraction;
    generating a visualization for the result data based at least in part on the data abstraction;
    receiving user feedback on regarding a representation of the result data with the visualization; and
    updating one or more rules for determining visualization types to be used to represent data based at least in part on corresponding data abstractions and the user feedback.

24. A computer program product embodied in a non-transitory computer readable medium for visualizing data, and the computer program product comprising computer instructions for:
    obtaining, by one or more processors, a natural language query;
    determining an intent for the natural language query;
    abstracting the result data to obtain a data abstraction; and
    generating a visualization for the result data based at least in part on the data abstraction;
    receiving user feedback on regarding a representation of the result data with the visualization; and
    updating one or more rules for determining visualization types to be used to represent data based at least in part on corresponding data abstractions and the user feedback.

25. A system for visualizing data, comprising:
    one or more processors configured to:
        obtain a natural language query;
        determine an intent for the natural language query;
        obtain query result data for the query based at least in part on the intent;
        abstract the result data to obtain a data abstraction, wherein abstracting the result data to obtain the data abstraction comprises:
            determining all possible ordered subsets of data for the result data;
            for each rule in a set of predefined rules, analyzing each subset of data with the particular rule to obtain a corresponding rule check;
            for each rule in the set of predefined rules, creating a score vector comprising the corresponding rule checks for the subsets of data;
            ranking the rules in the set of predefined rules based on the corresponding score vectors; and
            selecting the data abstraction based on the ranking of the rules;
        generate a visualization for the result data based at least in part on the data abstraction;
        receive user feedback on regarding a representation of the result data with the visualization; and
        updating one or more rules for determining visualization types to be used to represent data based at least in part on corresponding data abstractions; and
    a memory coupled to the one or more processors and configured to provide the one or more processors with instructions.

26. A method for visualizing data, comprising:

obtaining, by one or more processors, a natural language query;

determining an intent for the natural language query;

obtaining query result data for the query based at least in part on the intent;

abstracting the result data to obtain a data abstraction, wherein abstracting the result data to obtain the data abstraction comprises:

determining all possible ordered subsets of data for the result data;

for each rule in a set of predefined rules, analyzing each subset of data with the particular rule to obtain a corresponding rule check;

for each rule in the set of predefined rules, creating a score vector comprising the corresponding rule checks for the subsets of data;

ranking the rules in the set of predefined rules based on the corresponding score vectors; and selecting the data abstraction based on the ranking of the rules;

generating a visualization for the result data based at least in part on the data abstraction;

receiving user feedback on regarding a representation of the result data with the visualization; and updating one or more rules for determining visualization types to be used to represent data based at least in part on corresponding data abstractions.

\* \* \* \* \*